(12) United States Patent  (10) Patent No.: US 8,238,022 B2
Joo et al.  (45) Date of Patent: Aug. 7, 2012

(54) DISPLAY METHOD AND DEVICE USING PHOTONIC CRYSTAL CHARACTERISTICS

(75) Inventors: Jae Hyun Joo, Gyeonggi-do (KR); In Sook Lee, Gyeongsangbuk-do (KR); Jin Ha Kal, Seoul (KR); Da Hyeon Go, Seoul (KR)

(73) Assignee: Nanobrick Co., Ltd., Suwon (KR)

( * ) Notice: Subject to any disclaimer, the term of this patent is extended or adjusted under 35 U.S.C. 154(b) by 0 days.

(21) Appl. No.: 13/179,000

(22) Filed: Jul. 8, 2011

(65) Prior Publication Data

US 2012/0044128 A1  Feb. 23, 2012

Related U.S. Application Data

(63) Continuation of application No. 13/127,947, filed as application No. PCT/KR2010/004739 on Jul. 20, 2010.

(30) Foreign Application Priority Data

Jul. 22, 2009 (KR) .......... 10-2009-0067040
Mar. 12, 2010 (KR) .......... 10-2010-0022075

(51) Int. Cl.
*G02B 26/00* (2006.01)

(52) U.S. Cl. ............ 359/296
(58) Field of Classification Search ........ 359/296; 345/107

See application file for complete search history.

(56) References Cited

U.S. PATENT DOCUMENTS

2004/0227455 A1* 11/2004 Moon et al. .......... 313/501

FOREIGN PATENT DOCUMENTS

| JP | 2008-224765 A | 9/2008 |
| JP | 2008-224766 A | 9/2008 |
| KR | 10-0572547 B1 | 4/2003 |
| KR | 1020040011621 A | 2/2004 |
| KR | 10-0862665 B1 | 10/2008 |
| KR | 1020090006453 A | 1/2009 |
| KR | 1020090076065 A | 7/2009 |

* cited by examiner

*Primary Examiner* — Joseph P Martinez
(74) *Attorney, Agent, or Firm* — Hyunho Park

(57) ABSTRACT

A display method and device using photonic crystal characteristics are disclosed. In the display method using photonic crystal characteristics in accordance with the present invention, when a plurality of particles having electric charges are dispersed in a solvent, an electric field is applied to control inter-particle distance.

43 Claims, 39 Drawing Sheets

900

(a)  (b)

Fig. 2
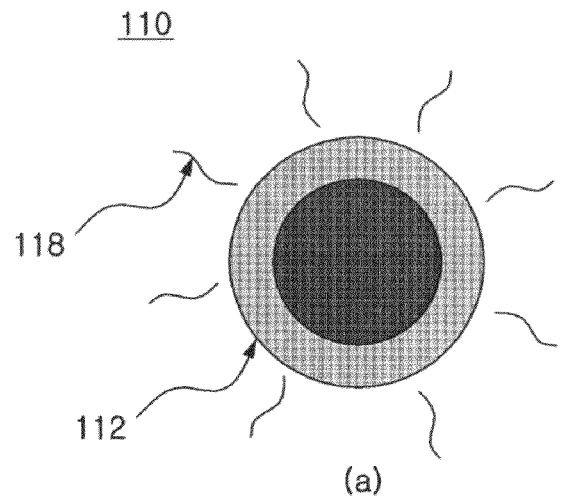
(a)
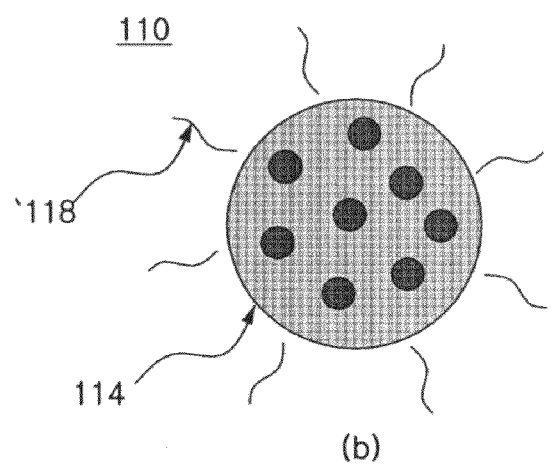
(b)
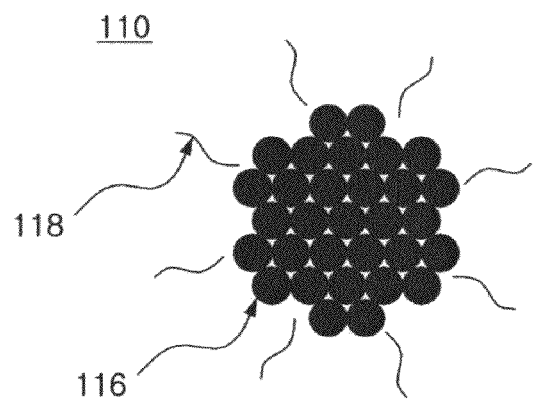

(a)  (b)

Fig. 7
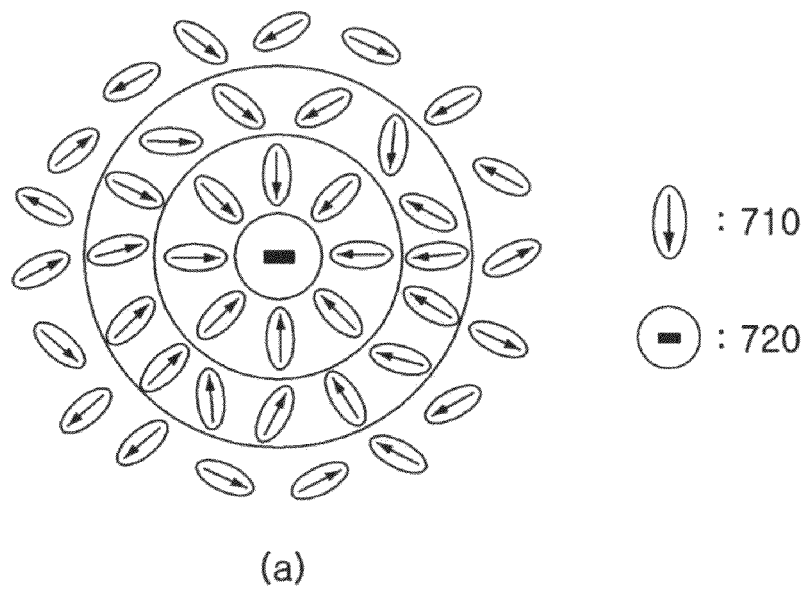
(a)
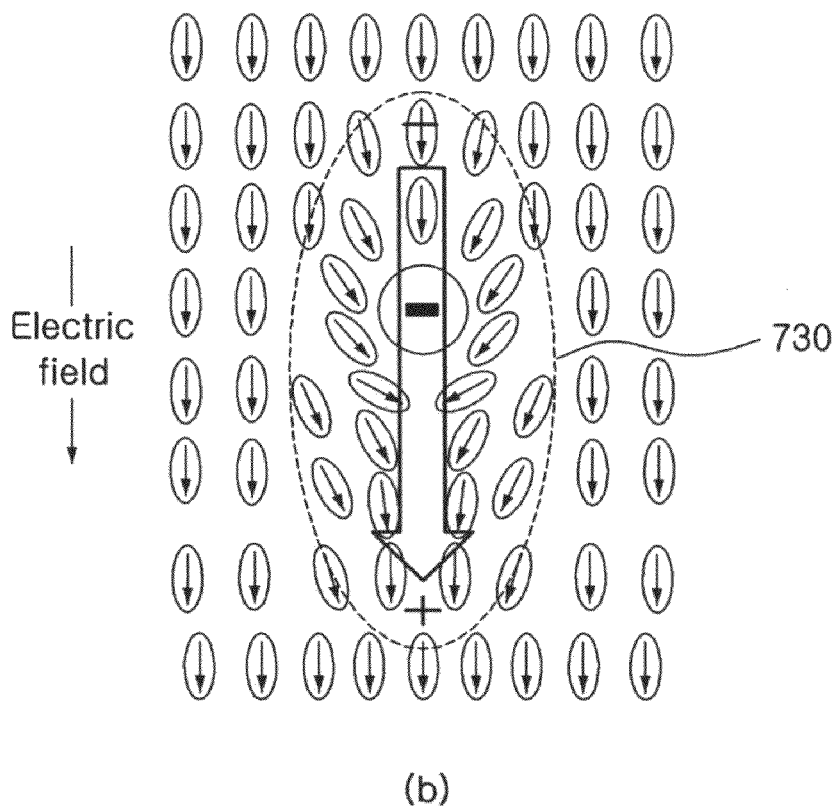
(b)

Fig. 8
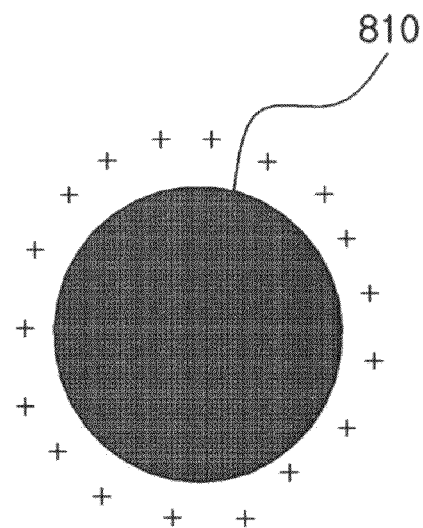
(a)
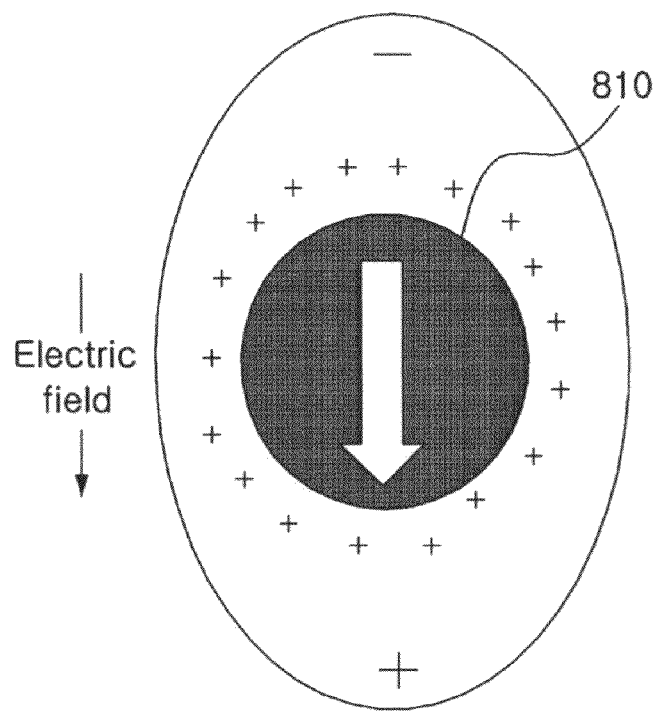
(b)

Fig. 22
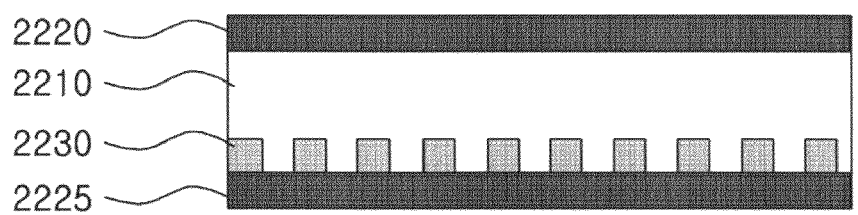
(a)
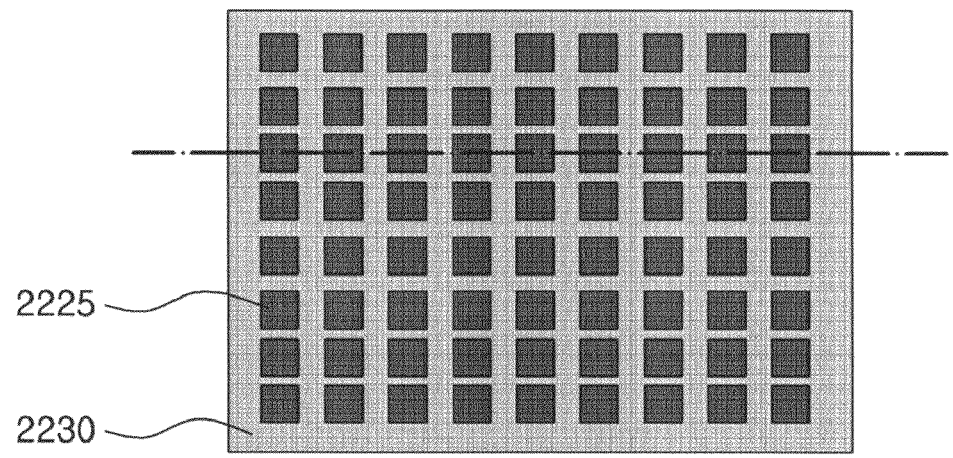
(b)

Fig. 23
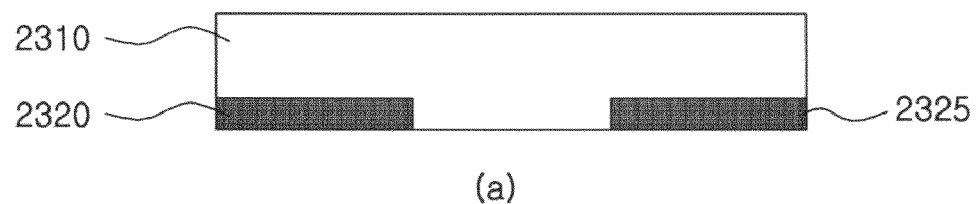
(a)
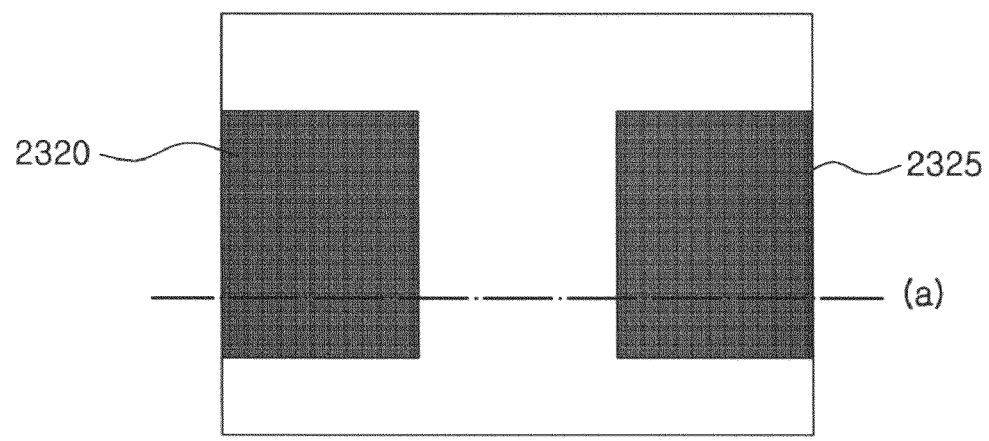
(b)

Fig. 29
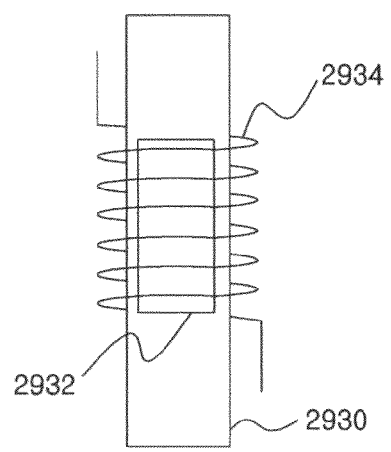
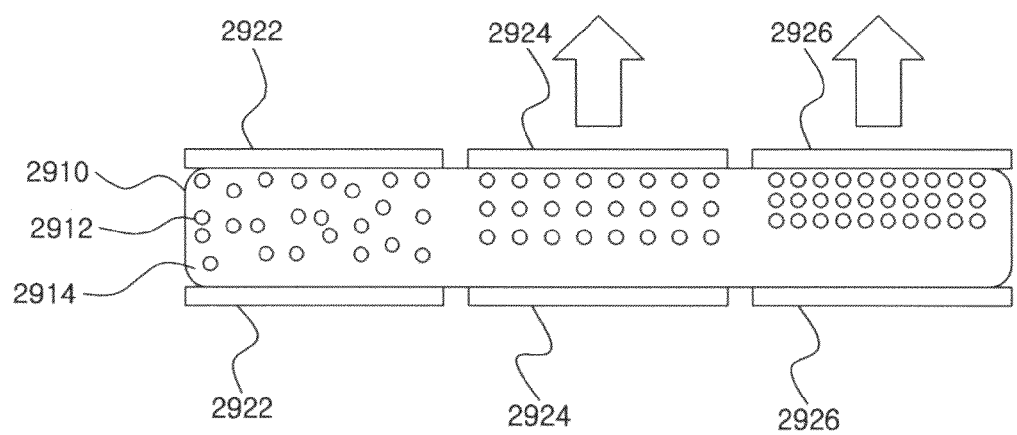

Fig. 30
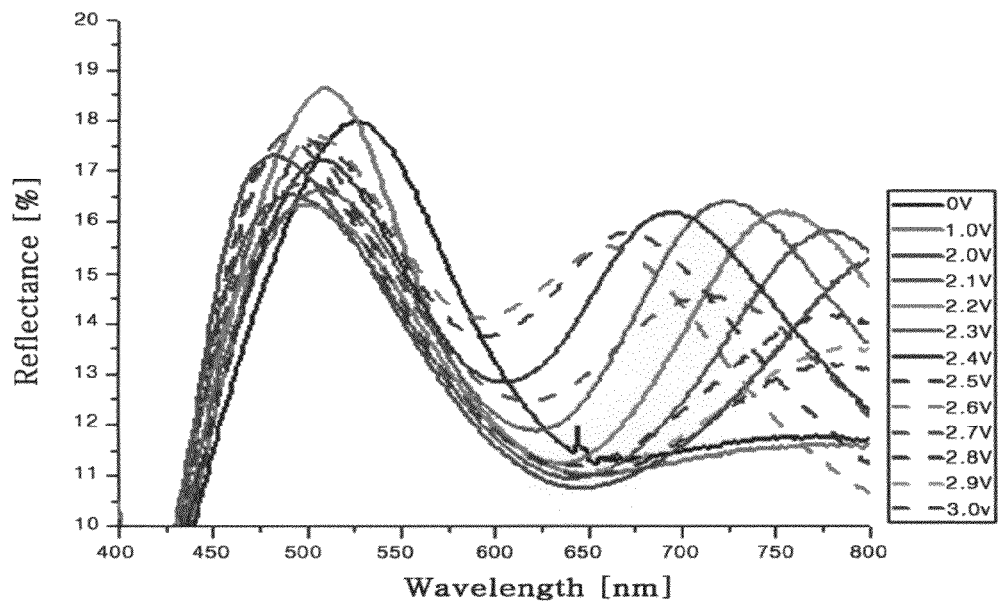
(a)
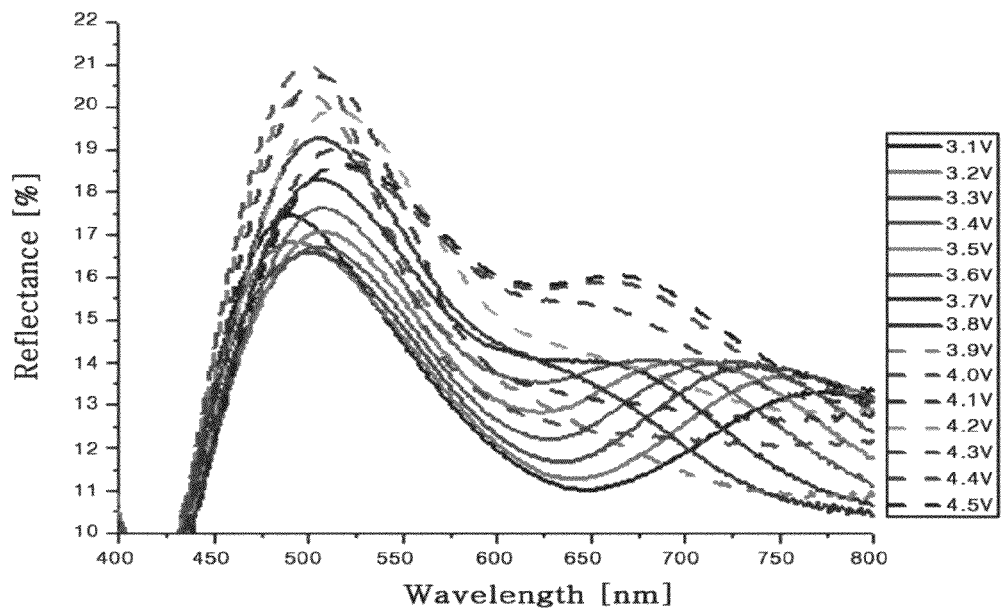
(b)

Fig. 32
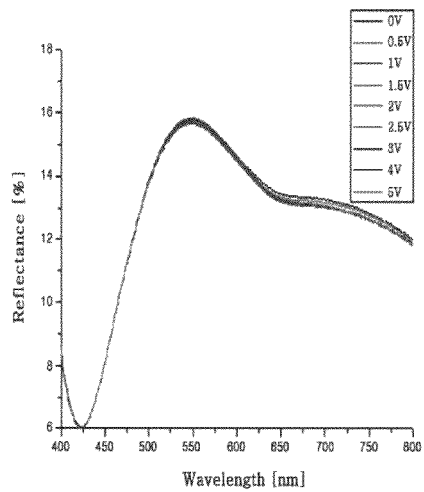
(a)
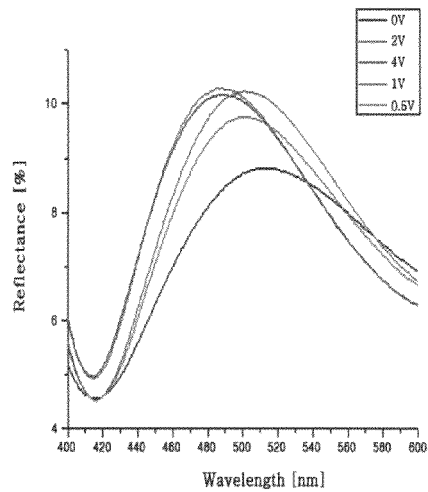
(b)
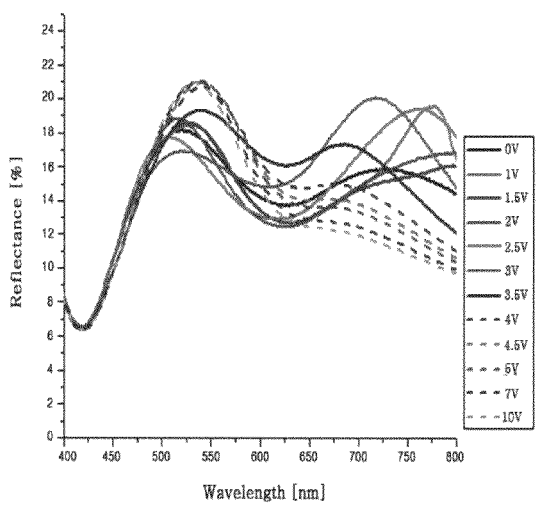
(c)
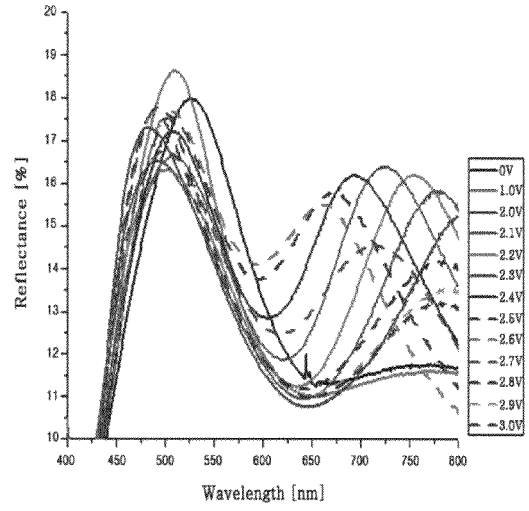
(d)

Fig. 33
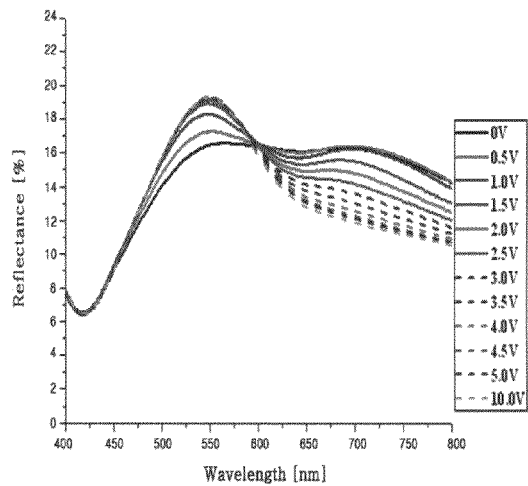
(a)
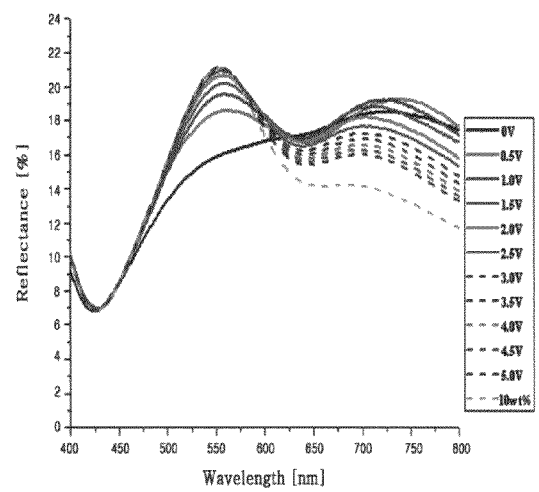
(b)
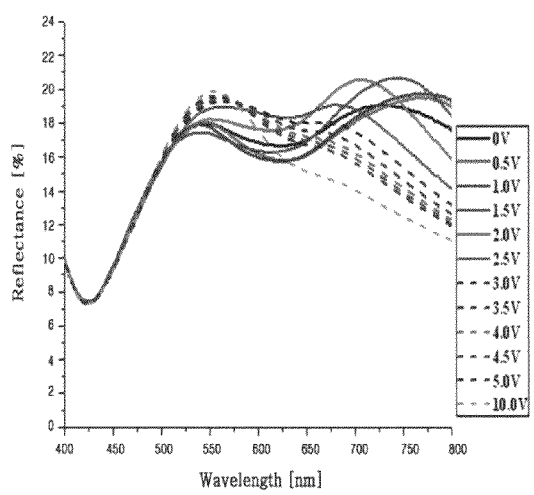
(c)
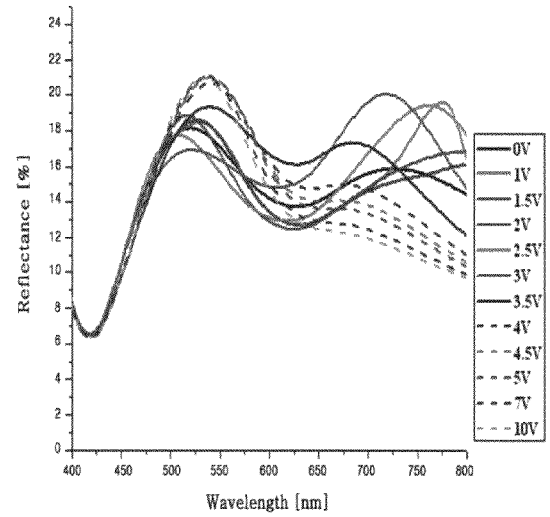
(d)

Fig. 34
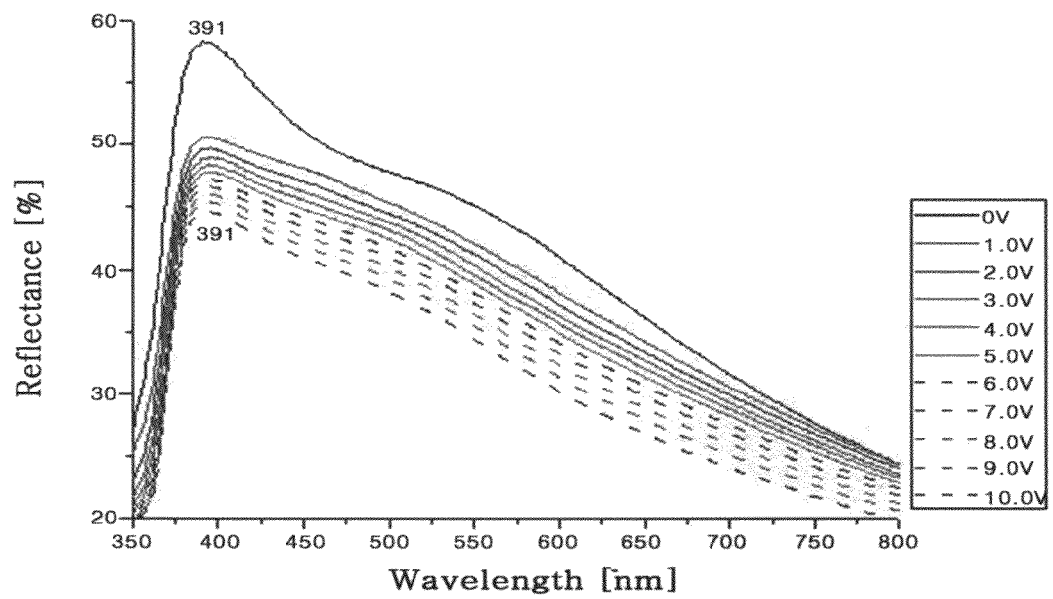
(a)
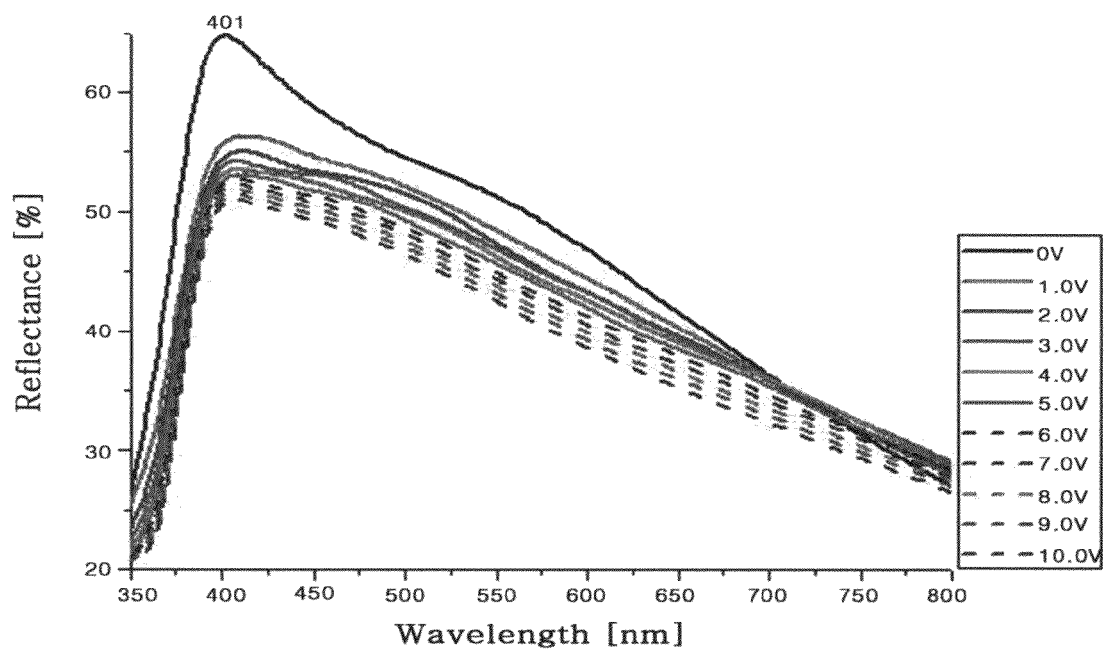
(b)

Fig. 35
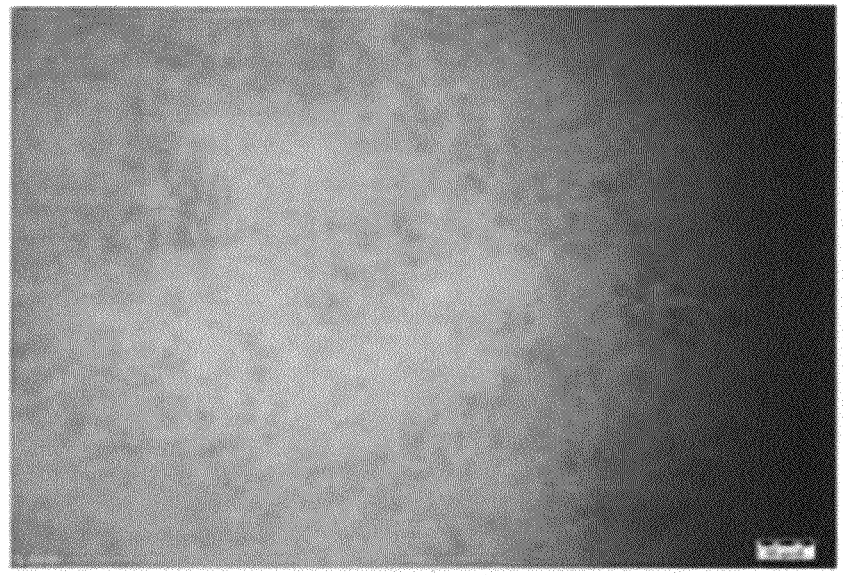
(a)
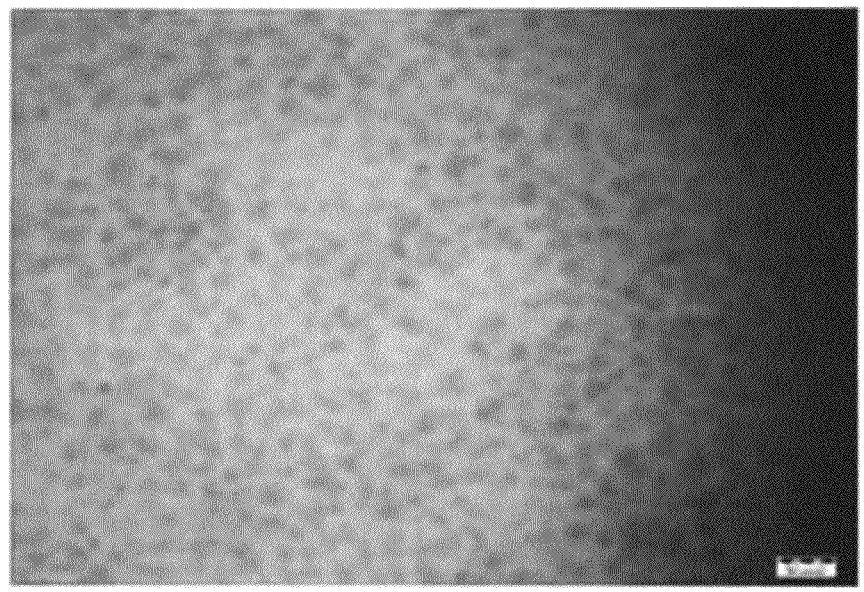
(b)

Fig. 36
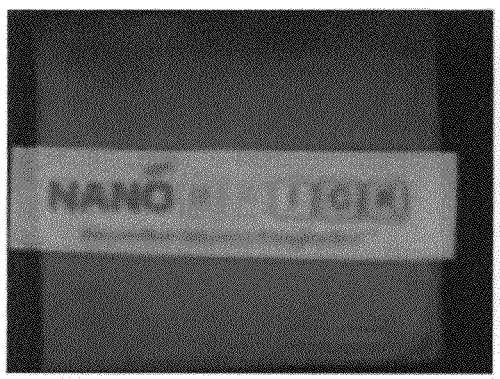
(a)
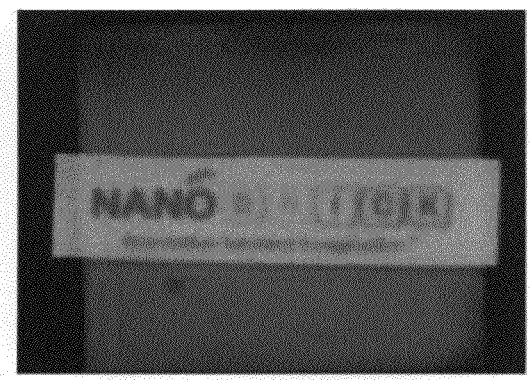
(b)
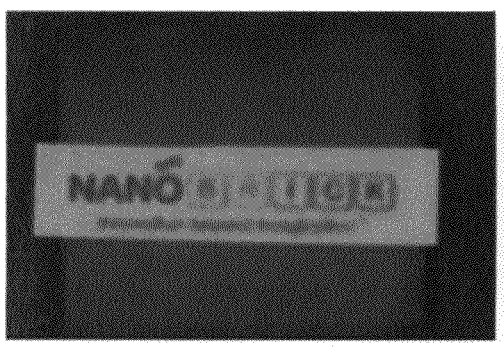
(c)
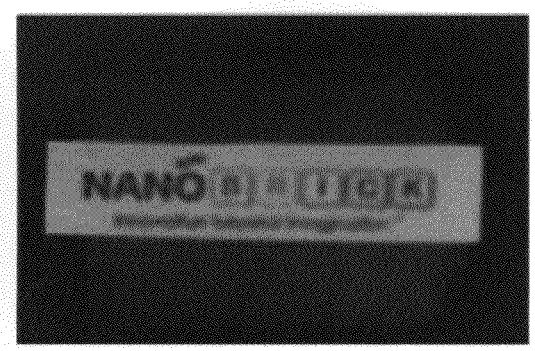
(d)
(e)

DISPLAY METHOD AND DEVICE USING PHOTONIC CRYSTAL CHARACTERISTICS

CROSS-REFERENCE TO RELATED APPLICATIONS

This application claims the benefit of Korean Patent Application Nos. 10-2009-0067040 and 10-2010-0022075, filed on Jul. 22, 2009 and Mar. 12, 2010, respectively, in the Korean Intellectual Property Office, the disclosures of which are incorporated herein in their entirety by reference.

FIELD OF THE INVENTION

The present invention relates to a display method and device using photonic crystal characteristics. More particularly, the present invention relates to a display method and device using photonic crystal characteristics, in which, when a plurality of particles having electric charges are dispersed in a solvent having electrical polarization characteristics, or particles having electric charges and electrical polarization characteristics are dispersed in a solvent, an electric field is applied to control inter-particle distances of the particles and thus control the wavelength of light reflected from the particles.

BACKGROUND OF THE INVENTION

Recently, as the research and development of next-generation displays is actively being pursued, a variety of display means is being introduced. A typical example of the next-generation displays may include an electronic ink. The electronic ink is a display in which an electric field is applied to particles of specific colors (e.g., black and white) respectively having negative charges and positive charges to display the specific colors. Electronic ink has the advantages of low power consumption and flexible display. However, the electronic ink is limited because it is difficult to represent various colors since the color of the particles is set to specific colors. Electronic ink has the further limitation of being unsuitable for displaying moving images because the display switching speed is low.

To fundamentally overcome the aforementioned problems of the conventional next-generation display, various methods have been suggested such as a method using the principle of photonic crystal.

The term "photonic crystal" refers to a material or crystal that is rendered in a color corresponding to a specific range of wavelengths by reflecting only light of a particular wavelength range among lights incident on a regularly arranged microstructure and transmitting light of the other wavelength ranges. Typical examples of photonic crystals include butterfly wings, beetle shells, etc. Although they do not contain any pigment, they include a unique photonic crystal structure, so they can produce unique colors.

While photonic crystals existing in nature reflect only light of a particular wavelength, artificially synthesized photonic crystals can arbitrarily change the crystalline structure thereof (e.g., interlayer thickness of the photonic crystals) by various external stimuli. As a result, the wavelength range of reflected light can be freely adjusted to cover ultraviolet or infrared regions as well as visible light regions.

Focusing on this point, the present applicants have arrived at the present invention upon discovering that it is possible to implement a display method and display device using photonic crystal characteristics. An electric field is applied to particles having electric charges or electrical polarization characteristics and/or a solvent with electrical polarization characteristics to control inter-particle distances of the particles and thereby reflect light of a certain wavelength range from the particles.

SUMMARY OF THE INVENTION

An object of the present invention is to provide a display method and display device using photonic crystal characteristics, in which, when particles having electric charges are dispersed in a solvent, particles having electric charges and electrical polarization characteristics are dispersed in a solvent, or particles having electric charges are dispersed in a solvent having electrical polarization characteristics, an electric field is applied to control inter-particle distances of the particles. Thus, the wavelength of light reflected from the particles is controlled.

Another object of the present invention is to provide a display method and display device using photonic crystal characteristics, which can control the wavelength of light reflected from particles by adjusting the intensity, direction, and duration of the application of an electric field applied to particles and a solvent.

Still another object of the present invention is to provide a display method and display device using photonic crystal characteristics, which can independently control inter-particle distances by using a structure such as capsules, cells, partitioned electrodes, etc.

In accordance with one aspect of the present invention, there is provided a display method using photonic crystal characteristics, wherein, when a plurality of particles having electric charges are dispersed in a solvent, an electric field is applied to control inter-particle distances of the particles.

At least one of the particles and the solvent may have electrical polarization characteristics.

As the electric field is applied, the inter-particle distance may be maintained within a specific range by interaction between an electric force, generated between the electrical field and the particles, causing electrophoresis of the particles and an electric force generated between the plurality of particles having the electric charges, and as the inter-particle distance are maintained within the specific range, light of a specific wavelength pattern may be reflected from the plurality of particles.

As the electric field is applied, the inter-particle distances may be maintained within a specific range by interaction between an electric force generated between the electrical field and the particles causing electrophoresis of the particles, an electric force generated between the plurality of particles having the electric charges, and an electric force generated by the electrical polarization, and as the inter-particle distances are maintained within the specific range, light of a specific wavelength pattern may be reflected from the plurality of particles.

The inter-particle distances may vary with changes in at least one of the intensity, direction, duration of application, period of application, and number of times of application of the electric field. The wavelength of the light reflected from the particles may vary with changes in the inter-particle distances.

The difference in refractive index between the particles and the solvent may be more than 0.3.

The particles and the solvent may be encapsulated or partitioned with a light transmissive insulating material.

A region to which the electric field is applied may be divided into at least two partial regions, and the electric field may be respectively applied to each of the divided partial regions.

After applying the electric field to the particles or the solvent, electric field having the opposite polarity to the applied electric field may be applied to reset the inter-particle distances.

Before applying the electric filed, a standby electric field may be applied in order to maintain the inter-particle distances at predetermined inter-particle distances.

Electric energy may be generated using light passing through the particles, and the electric field may be applied using the electric energy.

By applying the electric field through an upper electrode and a lower electrode and by setting the intensity of the electric field to be less than a predetermined value to control the moving range of the particles to be less than a predetermined value, a unique color of the particles, the solvent, the upper electrode, or the lower electrode may be displayed.

By applying the electric field through an upper electrode and a lower electrode and by setting the intensity of the electric field to be equal to or greater than a predetermined value to move the particles toward at least a partial region of either the upper electrode or the lower electrode, a unique color of the particles, the solvent, the upper electrode, or the lower electrode may be displayed.

By applying an electric field in a state where first particles having negative charges and second particles having positive charges are dispersed in the solvent the inter-particle distances between the first particles and the inter-particle distances between the second particles may be controlled independently from each other by the electric field.

The particles and the solvent may include a material that transmits visible light, and as the wavelength range of light reflected from the plurality of particles is out of the wavelength range of visible light, the particles and the solvent may become transparent.

The particles or the solvent may include a material which is electrically polarized by any one of electronic polarization, ionic polarization, interfacial polarization, or rotational polarization.

The particles or the solvent may include a superparaelectric or ferroelectric material.

The solvent may include a material having a polarity index of 1 or greater.

The solvent may be made of a material of a gel state.

In accordance with another aspect of the present invention, there is provided a display device using photonic crystal characteristics, including: a display unit including a plurality of particles having electric charges and a solvent containing the particles dispersed therein; and an electric field generating and/or applying unit for generating an electric field applied to the display unit, wherein, when the plurality of particles having electric charges are dispersed in the solvent, the electric field is applied to control inter-particle distances of the particles.

At least one of the particles and the solvent may have electrical polarization characteristics.

A region to which the electric field is applied may be divided into at least two partial regions, and the electric field may be respectively applied to each of the divided partial regions.

An electric energy may be generated using light passing through the particles, and the electric field may be applied using the electric energy.

By applying the electric field through an upper electrode and a lower electrode, and setting the intensity of the electric field to be less than a predetermined value to control the moving range of the particles to be less than a predetermined value, a unique color of the particles, the solvent, the upper or lower electrode may be displayed.

By applying the electric field through an upper electrode and a lower electrode, and setting the intensity of the electric field to be equal to or greater than a predetermined value to move the particles to a partial region of either the upper electrode or the lower electrode, an unique color of the particles, the solvent, the upper or lower electrode may be displayed.

By applying an electric field in a state where first particles having negative charges and second particles having positive charges are dispersed in the solvent the inter-particle distances between the first particles and the inter-particle distances between the second particles may be controlled independently from each other by the electric field.

BRIEF DESCRIPTION OF THE DRAWINGS

The above and other objects and features of the present invention will become apparent from the following description of the preferred embodiments, given in conjunction with the accompanying drawings, in which:

FIGS. 1 and 2 are views illustrating the configuration of particles contained in a display device in accordance with one embodiment of the present invention;

FIG. 7 is a view conceptually showing a configuration of control of inter-particle distances in accordance with a first embodiment of the present invention;

FIG. 8 is a view conceptually showing a configuration of control of inter-particle distances in accordance with a second embodiment of the present invention;

FIGS. 22 to 24 are views illustrating a configuration in which the electrodes constituting the electric field generating and/or applying unit are patterned in accordance with one embodiment of the present invention;

FIG. 29 is a view illustrating the configuration of a display device in accordance with another embodiment of the present invention;

FIGS. 30 and 31 are graphs and photographs showing light reflected from the particles as a result of performing an experiment for the application of an electric field when the particles having electric charges are dispersed in a solvent having electrical polarization characteristics in accordance with one embodiment of the present invention;

FIGS. 32 and 33 are graphs showing the wavelength of light reflected from the particles as a result of performing an experiment for the application of an electric field when the particles having electric charges are dispersed in various solvents having different polarity indices in accordance with one embodiment of the present invention;

FIGS. 34 and 35 are graphs and photographs showing light reflected from the particles as a result of performing an experiment for the application of an electric field when the particles having electric charges and electrical polarization characteristics are dispersed in a solvent in accordance with one embodiment of the present invention;

FIG. 36 is a view showing experimental results for the configuration for realizing a transparent display in accordance with one embodiment of the present invention;

DETAILED DESCRIPTION OF THE PREFERRED EMBODIMENT

Figure 1:
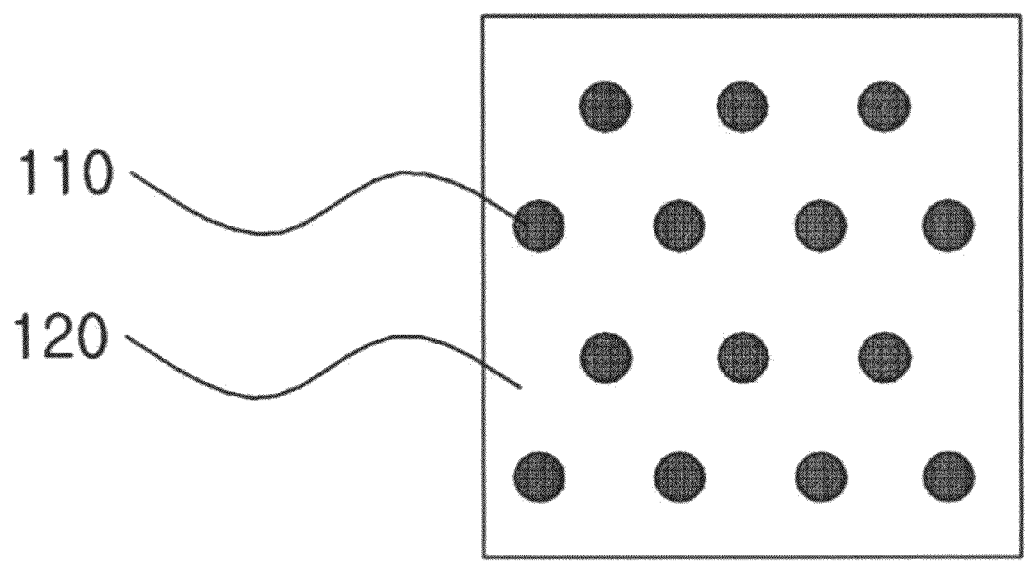

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different from one another, are not necessarily mutually exclusive.

For example, a particular feature, structure, and characteristic described herein in connection with one embodiment may be implemented within other embodiments without departing from the spirit and scope of the present invention. Also, it is to be understood that the positions or arrangements of individual elements in the embodiment may be changed without separating the spirit and scope of the present invention. The following detailed description is, therefore, not to be taken in a limiting sense, and the scope of the invention is defined only by the appended claims that should be appropriately interpreted along with the full range of equivalents to which the claims are entitled. In the drawings, like reference numerals identify identical or like elements or functions through the several views.

Hereinafter, the configuration of the present invention will be described in detail with reference to the accompanying drawings so that those skilled in the art can easily carry out the present invention.

Configuration of Display Device

A main technical feature of a display device in accordance with one embodiment of the present invention is that when particles having electric charges are dispersed in a solvent, particles having electric charges are dispersed in a solvent having electrical polarization characteristics, or particles having electric charges and electrical polarization characteristics are dispersed in a solvent, an electric field is applied to control inter-particle distances of the particles and thereby implement a full spectrum display using photonic crystal characteristics.

[Particles Having Electric Charges]

FIGS. 1 and 2 are views illustrating the configuration of particles contained in a display device in accordance with one embodiment of the present invention.

First, referring to FIG. 1, particles 110 in accordance with one embodiment of the present invention are dispersed in a solvent 120 as particles having negative charges or positive charges. At this point, the particles 110 may be arranged at predetermined spaces from each other by the repulsive force between them caused by electric charges of the same polarity. The diameter of the particles 110 may range from several nm to several hundred μm, but the particle diameter is not necessarily limited thereto.

Referring to FIG. 2, the particles 110 in accordance with one embodiment of the present invention may have a core-shell 112 configuration made from different types of materials as shown in (a) of FIG. 2, a multi-core 114 configuration made from different kinds of materials as shown in (b) of FIG. 2, or a cluster structure 116 made from a plurality of nanoparticles as shown in (c) of FIG. 2, in which a charge layer 118 having electric charges encloses the particles.

More specifically, the particles 110 in accordance with one embodiment of the present invention may be made of elements, such as silicon (Si), titanium (Ti), barium (Ba), strontium (Sr), iron (Fe), nickel (Ni), cobalt (Co), lead (Pb), aluminum (Al), copper (Cu), silver (Ag), gold (Au), tungsten (W), molybdenum (Mo), or a compound thereof. Also, the particles in accordance with one embodiment of the present invention may be made of polymer materials such as PS (polystyrene), PE (polyethylene), PP (polypropylene), PVC (polyvinyl chloride), and PET (polyethylene terephthalate). In addition, the particles in accordance with one embodiment of the present invention may be made by coating particles or a cluster having no electric charge with a material having electric charges. Examples of these particles may include particles whose surfaces are processed (or coated) with an organic compound having a hydrocarbon group; particles whose surfaces are processed (or coated) with an organic compound having a carboxylic acid group, an ester group, and an acyl group; particles whose surfaces are processed (or coated) with a complex compound containing halogen (F, Cl, Br, I, etc.) elements; particles whose surfaces are processed (coated) with a coordination compound containing amine, thiol, and phosphine; and particles having electric charges generated by forming radicals on the surfaces.

Meanwhile, in accordance with one embodiment of the present invention, in order to effectively exhibit photonic crystal characteristics by maintaining a stable colloidal state without precipitation of the particles in a solvent, the value of the electrokinetic potential (i.e., zeta potential) of a colloidal solution comprising particles and a solvent may be greater than or equal to a preset value, the difference in specific gravity between the particles and the solvent may be less than or equal to a preset value, and the difference in refractive index between the solvent and the particles may be greater than or equal to a preset value. For instance, the absolute value of the electrokinetic potential of the colloidal solution may be more than or equal to 10 mV, the difference in specific gravity between the particles and the solvent may be less than or equal to 5, and the difference in refractive index between the particles and the solvent may be more than or equal to 0.3.

[Electrical Polarization Characteristics]

Further, in accordance with one embodiment of the present invention, the particles and/or solvent contained in the display device may have electrical polarization characteristics. Such particles and/or solvent may include a material which is electrically polarized with any one of electronic polarization, ionic polarization, interfacial polarization, or rotational polarization due to asymmetrical charge distribution of atoms or molecules when an external electric field is applied.

Figure 3:
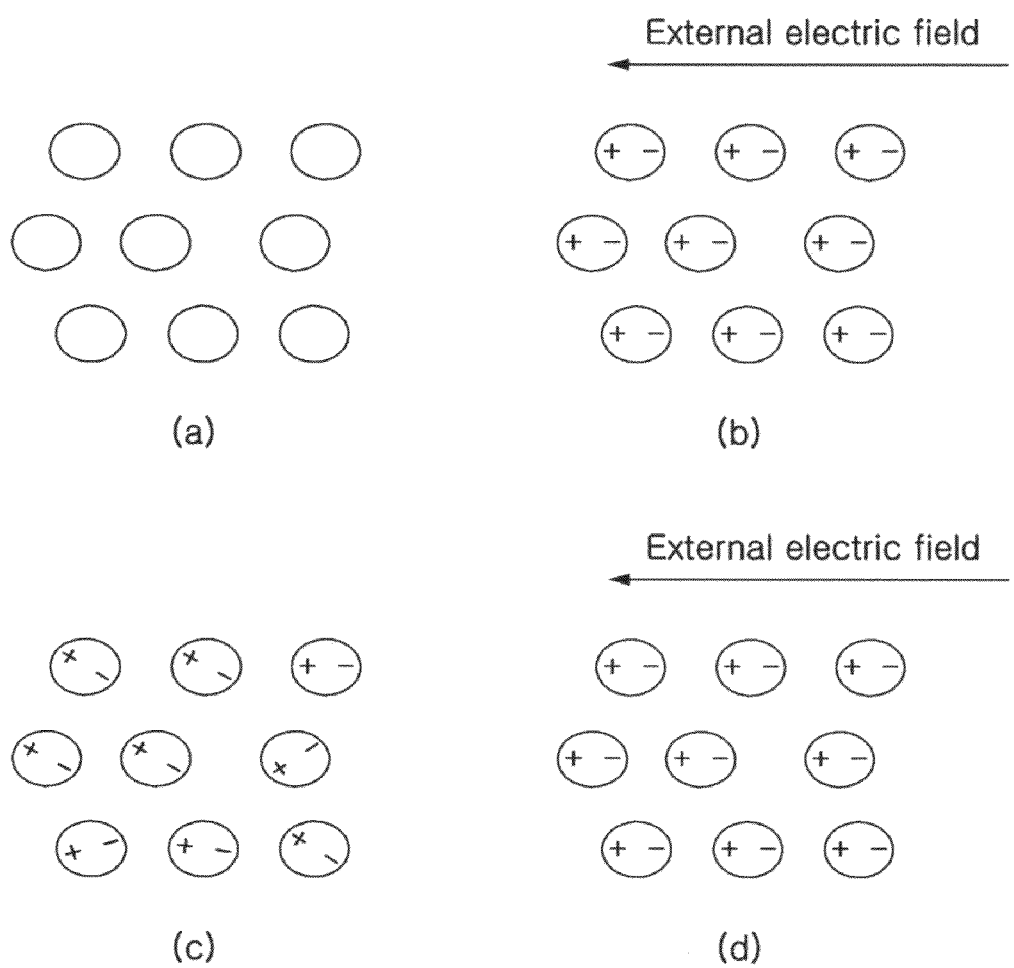
FIG. 3 is a view illustrating the configuration of polarization of particles or solvent upon application of an electric field in accordance with one embodiment of the present invention.

FIG. 3 is a view illustrating the configuration of polarization of particles or solvent upon application of an electric field in accordance with one embodiment of the present invention.

Referring to (a) and (b) of FIG. 3, if no external electric field is applied, the particles and/or solvent maintain an electrical equilibrium state. Whereas, if an external electric field is applied, electric charges in the particles and/or solvent move in a predetermined direction, and therefore the particles or solvent can be electrically polarized. Referring to (c) and (d) of FIG. 3, if no external electric field is applied, the particles and/or molecules of the solvent with unit polarization caused by electrically asymmetric components are arranged chaotically or randomly. Whereas, if an external electric field is applied, the particles and/or the molecules of the solvent having the unit polarization may be re-arranged in a predetermined direction along the direction of the external electric field and, thus, may show overall quite a large polarization value. Meanwhile, in accordance with one embodiment of the present invention, unit polarization may occur in the asymmetrical arrangement of electrons or ions or the asymmetrical structure of molecules. When no external electric field is applied, a very small remnant polarization value may be shown as well due to this unit polarization.

Figure 4:
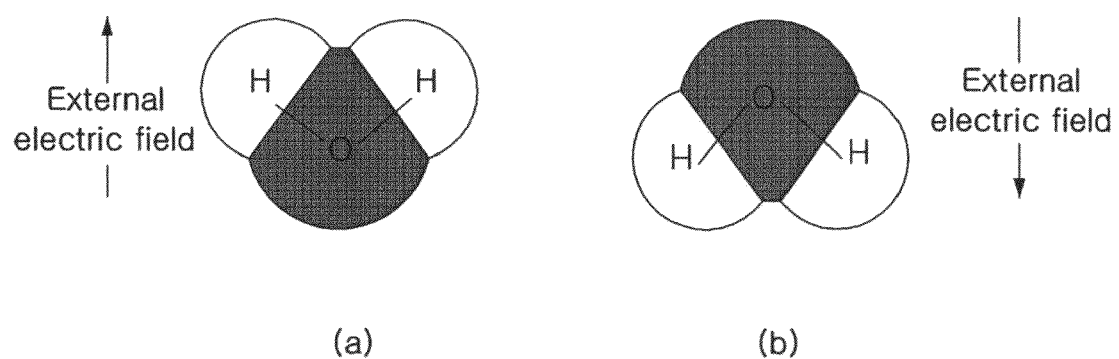
FIG. 4 is a view illustrating unit polarization characteristics exhibited by the asymmetrical arrangement of molecule in accordance with one embodiment of the present invention.

FIG. 4 is a view illustrating unit polarization characteristics exhibited by asymmetrical arrangement of molecules in accordance with one embodiment of the present invention. More specifically, FIG. 4 illustrates the case of water molecules ($H_2O$). In addition to the water molecules, trichloroethylene, carbon tetrachloride, di-iso-propyl ether, toluene, methyl-t-bytyl ether, xylene, benzene, diethyl ether, dichloromethane, 1,2-dichloroethane, butyl acetate, iso-propanol, n-butanol, tetrahydrofuran, n-propanol, chloroform, ethyl acetate, 2-butanone, dioxane, acetone, methanol, ethanol, acetonitrile, acetic acid, dimethylformamide, dimethyl sulfoxide, propylene carbonate, etc. may be employed as the material constituting the particles or solvent because they represent the unit polarization characteristics due to the asymmetry of a molecular structure. For reference, the polarity index used to compare the polarization characteristics of materials is an index that shows the relative degree of polarization of a given material with respect to the polarization characteristics of water ($H_2O$).

Figure 5:
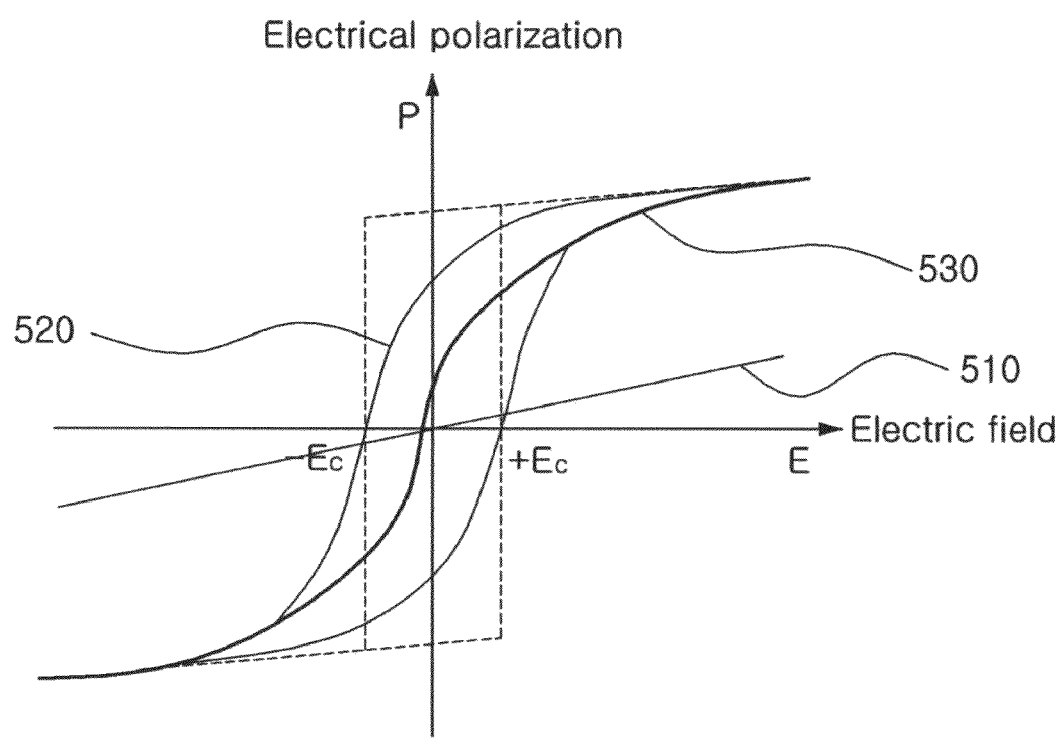
FIG. 5 is a view showing hysteresis curves of a paraelectric material, a ferroelectric material, and a superparaelectric material.

Moreover, the particles or solvent in accordance with one embodiment of the present invention may include a ferroelectric material, which shows an increase in polarization upon application of an external electric field and shows a large remnant polarization and remnant hysteresis even without the application of an external electric field. The particles or solvent may include a superparaelectric material, which shows an increase in polarization upon application of an external electric field and shows no remnant polarization and no remnant hysteresis when no external electric field is applied. Referring to FIG. 5, it can be seen that there are hysteresis curves which are obtained according to the external electric fields of a paraelectric material 510, the ferroelectric material 520, and the superparaelectric material 530.

Further, the particles or solvent in accordance with one embodiment of the present invention may include a material having a perovskite structure. Examples of materials having a perovskite structure, such as $ABO_3$, may include materials such as $PbZrO_3$, $PbTiO_3$, $Pb(Zr,Ti)O_3$, $SrTiO_3$ $BaTiO_3$, $(Ba,Sr)TiO_3$, $CaTiO_3$, $LiNbO_3$, etc.

Figure 6:
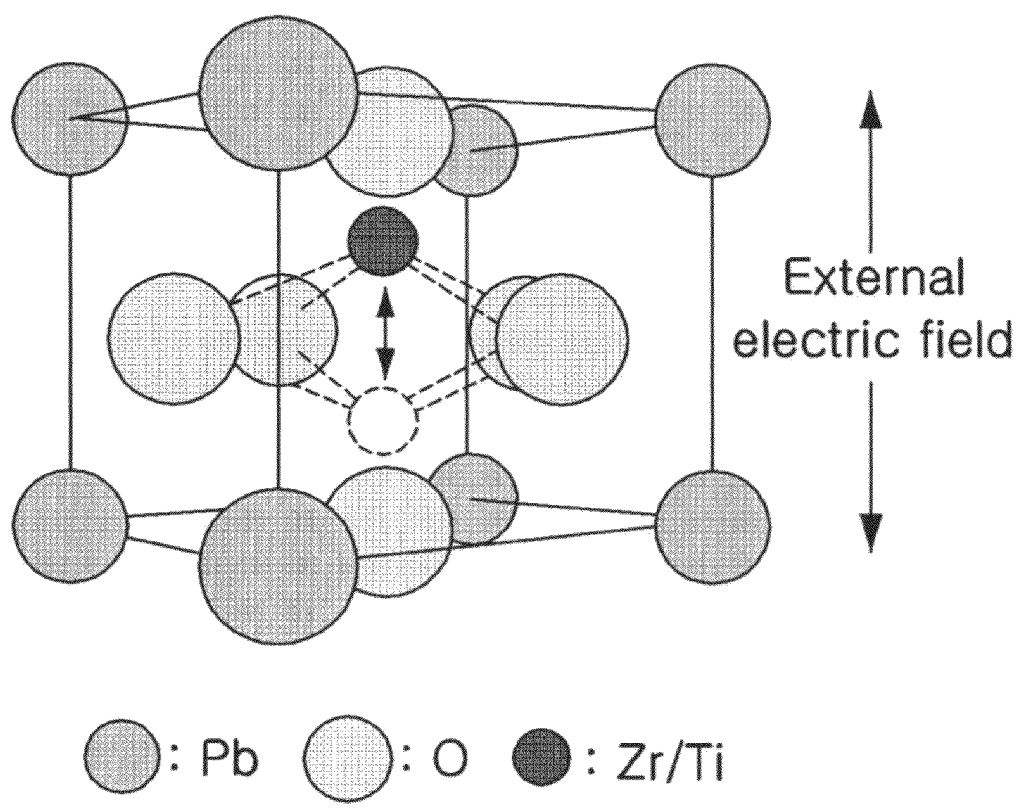
FIG. 6 is a view illustrating a material having a perovskite structure that may be included in the particles in accordance with one embodiment of the present invention.

FIG. 6 is a view illustrating a material having a perovskite structure that may be included in the particles or solvent in accordance with one embodiment of the present invention. Referring to FIG. 6, the position of Zr (or Ti) in $PbZrO_3$ (or $PbTiO_3$) (i.e., B in an $ABO_3$ structure) may vary with the direction of the external electric field applied to $PbZrO_3$ (or $PbTiO_3$), and thus, the overall polarity of $PbZrO_3$ (or $PbTiO_3$) may be changed.

Meanwhile, in accordance with one embodiment of the present invention, the solvent may include a material having a polarity index of 1 or greater.

The composition of the particles and solvent is not necessarily limited to those listed above, but may be appropriately changed within the scope of the objects of the present invention, i.e., within the scope in which the inter-particle distances of the particles can be controlled by an electric field.

[Operating Principle and Configuration of Display Device]

Meanwhile, in accordance with a first embodiment of the present invention, when a plurality of particles having electric charges of the same sign or polarity are dispersed in a solvent having electrical polarization characteristics, if an electric field is applied to the dispersion including the particles and the solvent containing the dispersed particles, electrical attraction proportional to the intensity of the electric field and the charge amount of the particles acts on the particles due to the electric charges of the particles. Therefore, the plurality of particles moves in a predetermined direction by electrophoresis, thus narrowing the inter-particle distances. In contrast, electrical repulsion generated between the particles having the electric charges of the same sign or polarity increases as the inter-particle distances become smaller resulting in a predetermined equilibrium state while preventing the inter-particle distances from continuing to decrease. Further, the solvent is electrically polarized in a predetermined direction due to the electrical polarization characteristics of the solvent. Thus, electrical attraction is locally generated and exerts a predetermined effect upon the inter-particle distances between the particles electrically interacting with the polarized solvent. That is, in accordance with the first embodiment of the present invention, the plurality of particles can be regularly arranged at distances where electrical attraction induced by an external electric field, electrical repulsion between the particles having electric charges of the same polarity, electrical attraction induced by polarization, and the like are in equilibrium. According to the above principle, the inter-particle distances can be controlled at predetermined levels, and the particles arranged at predetermined distances can function as photonic crystals. Since the wavelength of light reflected from the regularly spaced particles is determined by the inter-particle distance, the wavelength of the light reflected from the particles can be arbitrarily controlled by controlling the inter-particle distances. Here, a pattern of the wavelength of reflected light may be diversely represented by the factors, such as the intensity and direction of the applied electric field, the size and mass of the particles, the refractive indices of the particles and the solvent, the charge amount of the particles, the electrical polarization characteristics of the solvent, the concentration of the particles dispersed in the solvent, etc.

FIG. 7 is a view conceptually showing a configuration of control of inter-particle distances in accordance with a first embodiment of the present invention. Referring to FIG. 7, if no external electric field is applied, unit polarized solvent 710 near particles 720 having electric charges can be intensively arranged in the direction of the particles by interaction with the electric charges of the particles, and the unit polarized solvent 710 can be arranged more chaotically or randomly as its distance from the charged particles increases (See (a) of FIG. 7). Also, referring to FIG. 7, if an external electric field is applied, the unit polarized solvent 710 located in a region not affected by the particles 720 (i.e., a region far away from the particles 720) is re-arranged in the direction of the electric field. The unit polarized solvent 710 located in a region strongly affected by electrical attraction induced by the electric charges of the particles 720 (i.e., a surrounding region of the particles 720) can be asymmetrically arranged by interaction between the electrical attraction induced by the electric charges of the particles 720 and the electrical attraction induced by the external electric field. As such, the region where the solvent 710 in the surrounding region of the particles 720 is asymmetrically arranged, i.e., a polarization region 730, acts like one large, electrically polarized particle and thus can interact with other large polarization regions, thereby enabling the particles having electric charges to be regularly arranged while maintaining a predetermined interval or space therebetween (See (b) of FIG. 7).

In accordance with a second embodiment of the present invention, when a plurality of particles having electric charges of the same sign or polarity as each other and electrical polarization characteristics are dispersed in a solvent, if an electric field is applied to the particles and the solvent, electrical attraction proportional to the intensity of the electric field and the charge amount of the particles acts on the particles due to the electric charges of the particles. Therefore, the particles move in a predetermined direction by electrophoresis, thus narrowing the inter-particle distances. In contrast, electrical repulsion generated between the particles having the electric charges of the same sign or polarity increases as the inter-particle distances decreases, thus reaching a predetermined equilibrium state while preventing the inter-particle distances from continuing to decrease. The particles are electrically polarized in a predetermined direction due to the electrical polarization characteristics of the particles. Thus, electrical attraction is locally generated between the polarized particles and exerts a predetermined effect upon the inter-particle distances.

That is, in accordance with the second embodiment of the present invention, the particles can be regularly arranged at a distance where electrical attraction induced by an external electric field, electrical repulsion between the particles having electric charges of the same sign, and electrical attraction induced by polarization are in equilibrium. According to the above principle, the inter-particle distances can be controlled at predetermined intervals, and the plurality of particles arranged at predetermined intervals can function as photonic crystals. Since the wavelength of light reflected from the plurality of regularly arranged particles is determined by the inter-particle distances, the wavelength of the light reflected from the particles can be accurately controlled by controlling the inter-particle distances. Here, a pattern of the wavelength of reflected light may be diversely represented by the factors, such as the intensity and direction of an electric field, the size and mass of the particles, the refractive indices of the particles and the solvent, the charge amount of the particles, the electrical polarization characteristics of the particles, the concentration of the particles dispersed in the solvent, etc.

FIG. 8 is a view conceptually showing a configuration of control of inter-particle distances in accordance with a second embodiment of the present invention. Referring to FIG. 8, if no external electric field is applied, particles 810 are not polarized (see (a) of FIG. 8). If an external electric field is applied, the particles 810 can be electrically polarized due to the electrical polarization characteristics of the material in the particles 810. Accordingly, the particles 810 can be regularly arranged while maintaining a predetermined interval or space therebetween (see (b) of FIG. 8).

In the first and second embodiments of the present invention, the greater the electrical polarization value of the solvent or particles, the higher the degree of interaction between the polarization regions 730 or between the polarized particles 810, thereby enabling the particles to be more regularly arranged.

Figure 9:
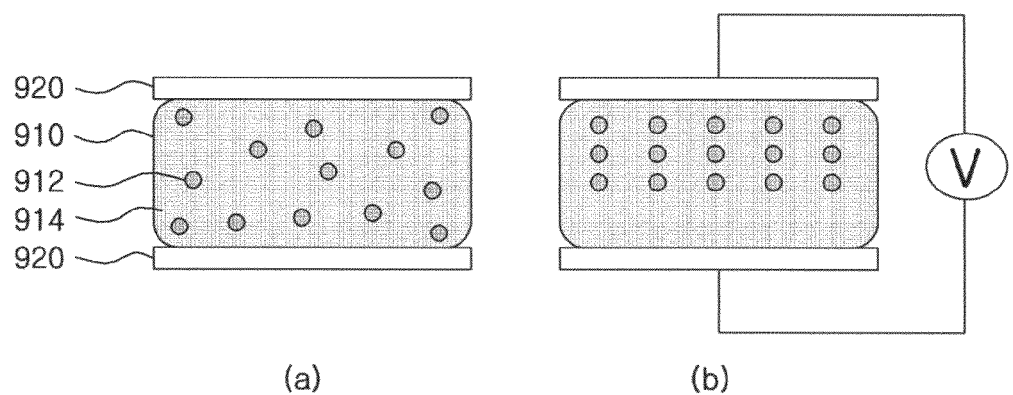
FIG. 9 is a view illustrating the configuration of a display device in accordance with one embodiment of the present invention.

FIG. 9 is a view illustrating the configuration of a display device in accordance with one embodiment of the present invention.

Referring to FIG. 9, a display device 900 in accordance with one embodiment of the present invention may include a display unit 910 and an electric field generating and/or applying unit 920. More specifically, in accordance with the first embodiment of the present invention, a plurality of particles 912 having electric charges of the same sign, which are dispersed in a solvent 914 having electrical polarization characteristics, may be included in the display unit 910. In accordance with the second embodiment of the present invention, a plurality of particles 912 having electric charges of the same sign and electrical polarization characteristics which are dispersed in a solvent 914 may be included in the display unit 912.

Figure 10:
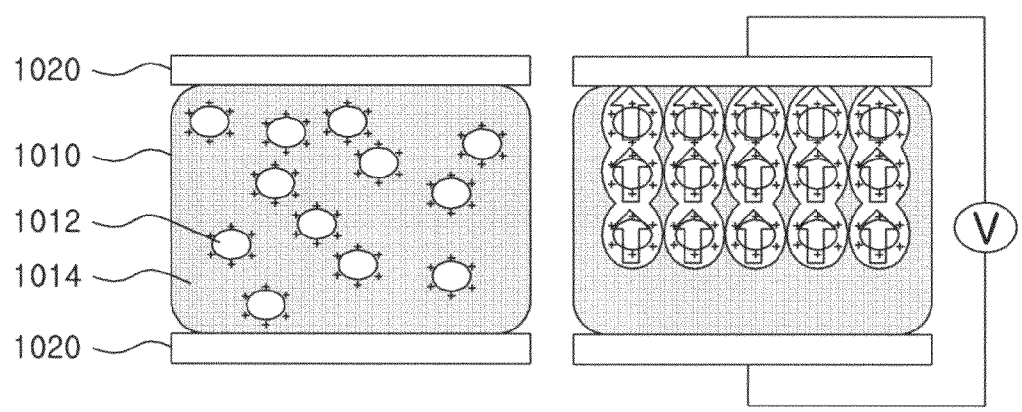
FIGS. 10 and 11 are views conceptually showing the configuration of the display device in accordance with the first and second embodiments of the present invention.
Figure 11:
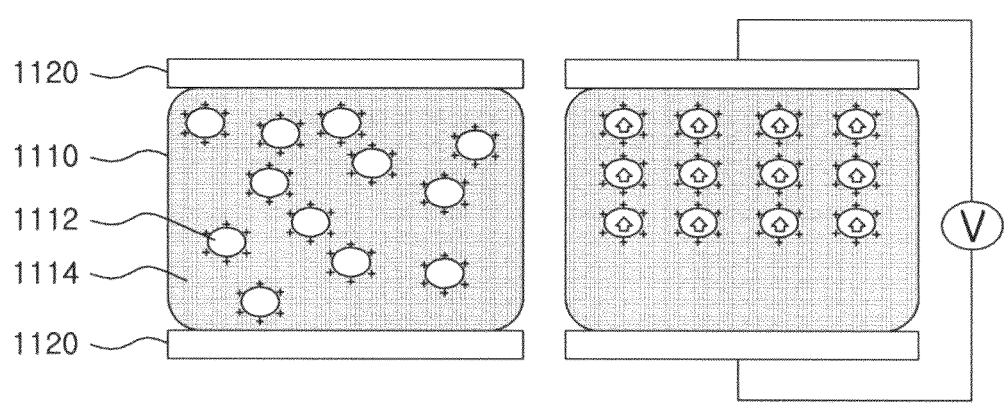

FIGS. 10 and 11 are views conceptually showing the configuration of the display device in accordance with the first and second embodiments of the present invention. Since the first and second embodiments of the present invention have been already described in full details with reference to FIGS. 7 and 8, additional explanation of FIGS. 10 and 11 are omitted.

In accordance with one embodiment of the present invention, the display unit 910 performs the function of reflecting light of a certain wavelength range (i.e., light of a certain color when viewed from a visible light region) depending on the intensity and/or direction of an applied electric field. As stated above, this can be achieved by controlling the inter-particle distances of the particles 912 depending on the intensity and/or direction of the electric field applied to the display unit 910.

Next, the electric field generating and/or applying unit 920 performs the function of applying an electric field of a predetermined intensity and/or direction to the display unit 910. The intensity and/or direction of the electric field applied by the electric field generating and/or applying unit 920 can be properly controlled over a wavelength range of light desired to be reflected from the display unit 910.

Figure 12:
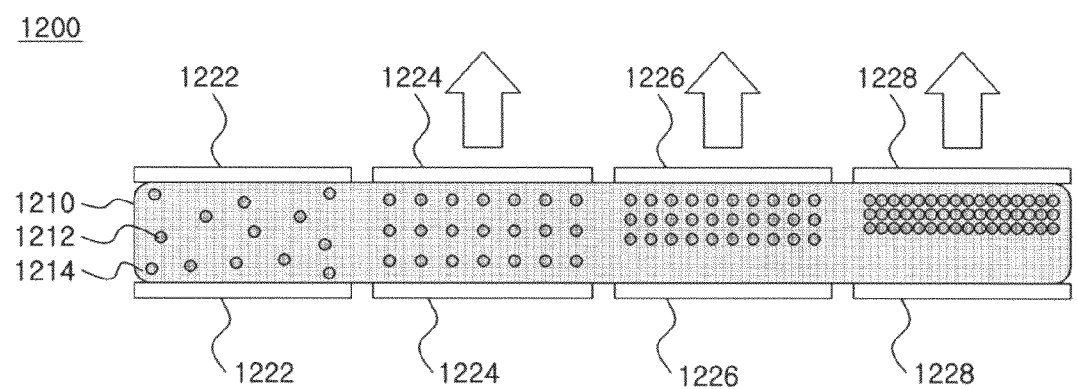
FIG. 12 is a view illustrating the configuration of a display device including an electric field generating and/or applying unit including a plurality of electrodes in accordance with one embodiment of the present invention.

More specifically, FIG. 12 is a view illustrating the configuration of a display device including an electric field generating or applying unit including a plurality of electrodes in accordance with one embodiment of the present invention.

Referring to FIG. 12, electric field generating and/or applying units 1222, 1224, 1226, and 1228 may include electrodes 1222, 1224, 1226, and 1228 that are capable of independently applying an electric field only to partial regions of a display unit 1210 in order to control the inter-particle distances of the particles 1212 included in the display unit 1210 more precisely and independently. The electrodes 1222, 1224, 1226, and 1228 can be individually controlled by a fine driving circuit, such as a thin film transistor (TFT). The electric field generating and/or applying units 1222, 1224, 1226, and 1228 may be made of a light transmissive material so as not to obstruct the progression of the light emitted from the display unit 1210. For instance, the electric field generating and/or applying units 1222, 1224, 1226, and 1228 may be made of indium tin oxide (ITO), titanium oxide ($TiO_2$), carbon nano tubes (which are light transmissive materials), and other electrically conductive polymer films.

Referring to FIG. 12, the electric field generating and/or applying units 1222, 1224, 1226, and 1228 may include a first electrode 1222, a second electrode 1224, a third electrode 1226, and a fourth electrode 1228. Because no electric filed is applied to a space covered by the first electrode 1222 to which no voltage is applied, the particles 1212 located in the space covered by the first electrode 1222 may be irregularly arranged. Therefore, the display unit 1210 controlled by the first electrode 1222 may not represent a color caused by photonic crystal. Next, because electric fields corresponding to respective voltages are applied to spaces covered by the second electrode 1224, third electrode 1226, and fourth electrode 1228 to which voltages of different levels are applied, the particles 1212 located in the spaces covered by these electrodes may be regularly arranged at predetermined inter-particle distances from each other while electrical attraction caused by the electric fields (i.e., a force that causes electrophoresis), electrical repulsion between the particles 1212 having electric charges of the same sign, and electrical attraction caused by the polarization (or its increase) of the particles 1212 or solvent 1214, etc. are in equilibrium. Accordingly, the display unit 1210 controlled by the second electrode 1224, third electrode 1226, and fourth electrode 1228 can reflect light of different wavelength ranges for the respective regions (i.e., structural colors caused by photonic crystals). For instance, under the assumption that a voltage applied to the fourth electrode 1228 is greater than a voltage applied to the third electrode 1226, the inter-particle distances of the particles 1212 located in the space covered by the fourth electrode 1228 may be narrower than the inter-particle distances of the particles 1212 located in between the third electrode 1226. Thus, the display unit 1210 controlled by the fourth electrode 1228 can reflect light of a shorter wavelength than the display unit 1210 controlled by the third electrode 1226 can.

Figure 13:
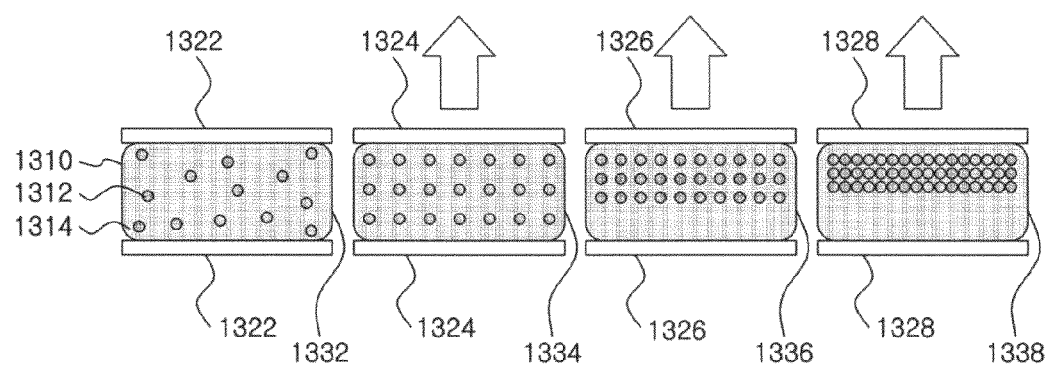
FIG. 13 is a view illustrating a configuration in which the particles and solvent included in the display device are encapsulated in a plurality of capsules in accordance with one embodiment of the present invention.

FIG. 13 is a view illustrating a configuration in which the particles and solvent included in the display device are encapsulated in a plurality of capsules in accordance with one embodiment of the present invention.

Referring to FIG. 13, particles 1312 and solvent 1314 included in a display unit 1300 encapsulated in capsules 1322, 1324, 1326, and 1328 made of a light transmissive material. By encapsulating the particles 1312 and the solvent 1314 as shown in FIG. 13, direct interference, such as incorporation, between the particles 1312 and solvent 1314 included in different capsules can be prevented; the particles can be prevented from being irregularly arranged due to electrohydrodynamic (EHD) motion of the particles having electric charges; the film processability of the display device 1300 can be improved by making sealing of the particles and the solvent easier; and the inter-particle distances of the particles contained in the display device 1300 can be independently controlled for each capsule.

Referring to FIG. 13, the display device 1300 may include four capsules 1322, 1324, 1326, and 1328. A first voltage, second voltage, third voltage, and fourth voltage can be respectively applied to electrodes 1332, 1334, 1336, and 1338 located in the portions of the first capsule 1322, second capsule 1324, third capsule 1326, and fourth capsule 1328. Accordingly, the respective capsules, to which electric fields of different intensities and different directions are applied, reflect light of different wavelength ranges. As such, with the display device 1300 in accordance with one embodiment of the present invention, an independent display can be implemented for each capsule.

Unlike FIG. 13, if the electrodes and the capsules are not disposed in a corresponding way to each other and instead, a region covered by electrodes is smaller than a capsule or one capsule is covered by two or more electrodes, an independent display can be implemented as desired for a given region of the display unit by using an electrode pattern. That is, in accordance with one embodiment of the present invention, when an electric field is applied to a specific region in a capsule through one of the electrodes that covers the capsule, only the solvent and/or particles existing in the specific region among the particles existing in the capsule reacts with the electric field, but the particles and/or solvent existing in other regions does not react with the electric field. Thus, a region (i.e., display region) on which light of a specific wavelength is reflected can be determined by an electrode pattern, rather than by the size or pattern of the capsules.

Figure 14:
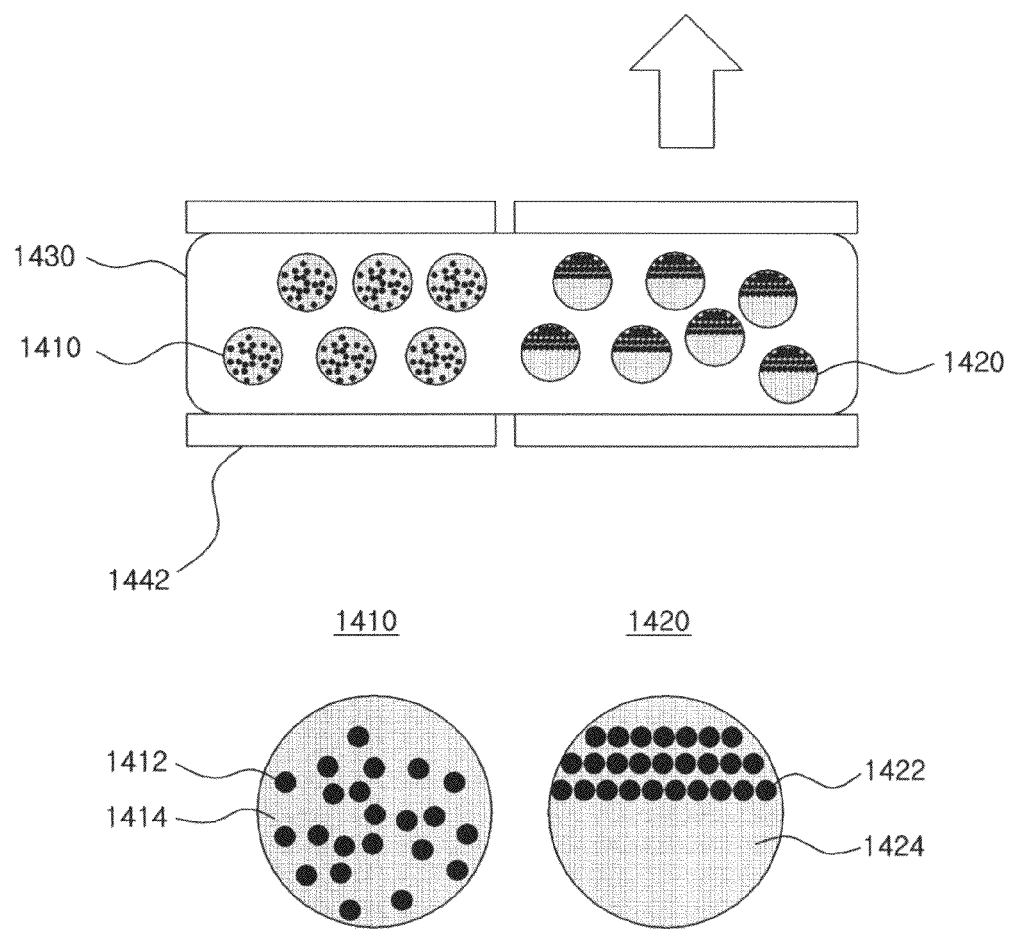
FIG. 14 is a view illustrating a configuration in which the particles and solvent included in the display device are dispersed in a medium in accordance with one embodiment of the present invention.

FIG. 14 is a view illustrating a configuration in which the particles and solvent included in the display device are dispersed in a medium in accordance with one embodiment of the present invention.

Referring to FIG. 14, the particles and solvent included in a display device 1400 in accordance with one embodiment of the present invention may be dispersed in a medium 1430 made of a light transmissive material. More specifically, a predetermined amount of particles and solvent is dispersed and distributed in the form of droplets in the light transmissive material 1430 which does not change in response to external stimuli such as an electric field, thus partially isolating the particles contained in the display device 1400. That is, in accordance with one embodiment of the present invention, the solvent with the particles dispersed therein is dispersed and distributed in the light transmissive medium 1430 to prevent the occurrence of direct interference, such as incorporation, between the particles or solvent included in different regions to thereby control the inter-particle distances of the particles contained in the display device 1400 more independently.

The display device 1400 may include a plurality of regions 1412 and 1414 included in the medium 1430. More specifically, the inter-particle distances of the particles contained in a first region 1410 located in between the first electrodes 1442 to which a first voltage is applied and the inter-particle distances of the particles contained in the second region 1420 located in between second electrodes 1444 to which a second voltage is applied can be controlled independently from each other. Therefore, the first region 1410 and the second region 1420 can reflect light of different wavelength ranges. Accordingly, with the display device 1400, an independent display can be implemented for each region.

Figure 15:
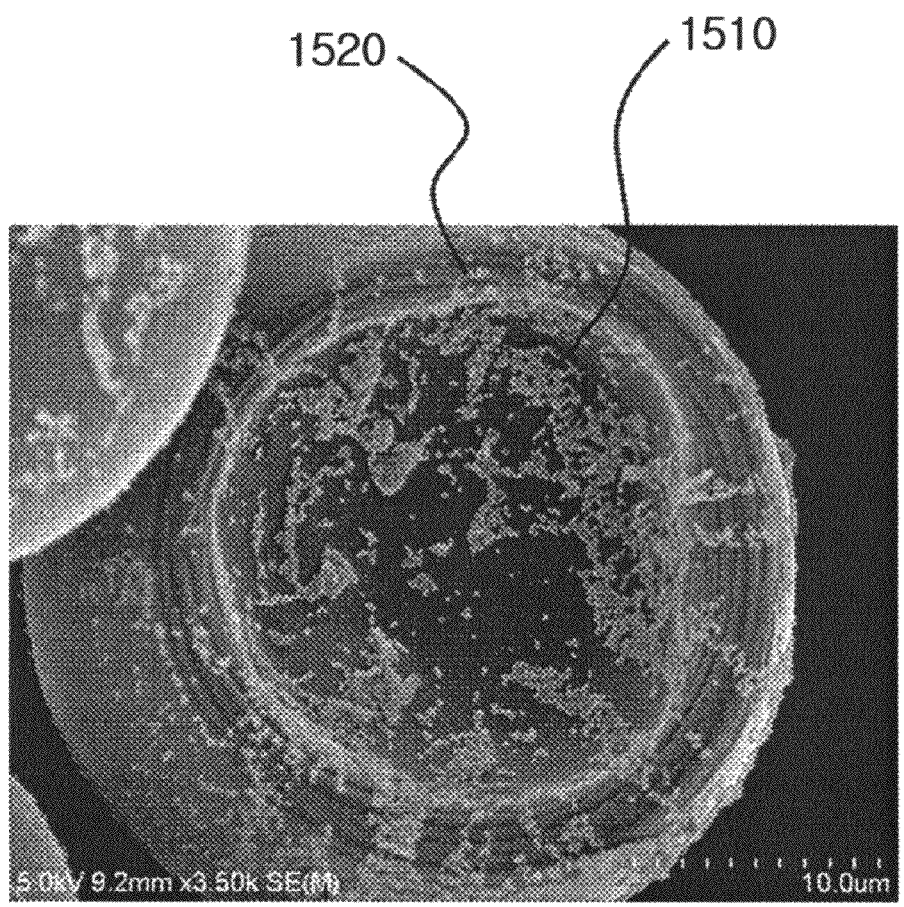
FIGS. 15 and 16 are views illustrating the composition of the particles and solvent dispersed in a medium in accordance with one embodiment of the present invention.

FIG. 15 is a view illustrating the composition of a solution encapsulated in a light transmissive medium in accordance with one embodiment of the present invention. For reference, FIG. 15 corresponds to a photograph taken by an electron microscope on a cross-section of the display device 1300 mentioned with reference to FIG. 13.

Referring to FIG. 15, it can be seen that the solvent with the particles 1510 dispersed therein is encapsulated in a light transmissive material which does not change by an electric field. In accordance with one embodiment of the present invention, the solution (i.e., mixture of the particles and the solvent) with the particles 1510 dispersed in the solvent in a colloidal state is mixed with a different kind of immiscible solution to form an emulsion, and then the emulsion interface is coated with the light transmissive material 1520, thereby being encapsulated in the light transmissive material 1520. Here, an oxidized steel ($FeO_x$) cluster coated with a charge layer may be used as the particles, a solvent having electrical polarization characteristics may be used as the solvent, and a light transmissive polymer material containing gelatin may be used as the capsule material.

Figure 16:
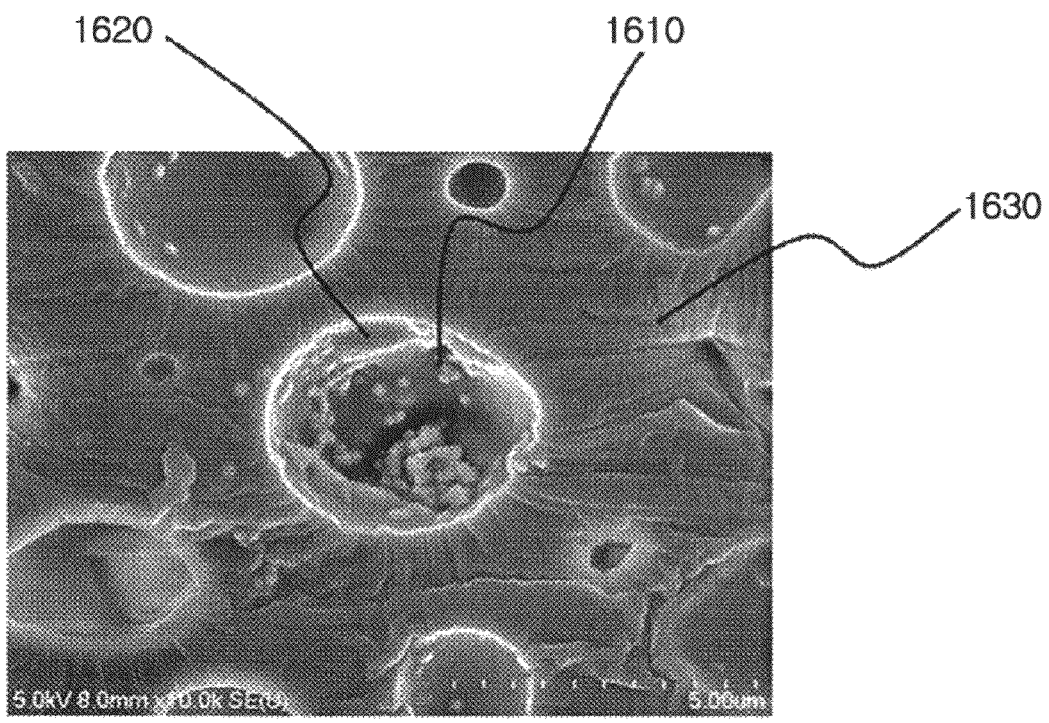

FIG. 16 is a view illustrating the composition of the particles and solvent dispersed in a medium in accordance with one embodiment of the present invention. For reference, FIG. 16 corresponds to a photograph taken by an electron microscope on a cross-section of the display device 1400 mentioned with reference to FIG. 14.

Referring to FIG. 16, it can be seen that the solvent 1620 with the particles 1610 dispersed therein is dispersed in a medium 1630 made of light transmissive material of a solid or gel state which does not change in response to external stimuli, such as an electric field, a magnetic field, etc. The particles 1610 having electric charges are dispersed in the solvent 1620 and the resultant dispersion are evenly mixed in the light transmissive medium 1630 in the form of droplets, thereby obtaining the composition shown in FIG. 16. Moreover, the particles 1610 may be an oxidized steel ($FeO_x$) cluster coated with a charge layer, the solvent 1620 may be ethylene glycol (EG), and the medium 1630 may be polydimethylsiloxane (PDMS).

Figure 17:
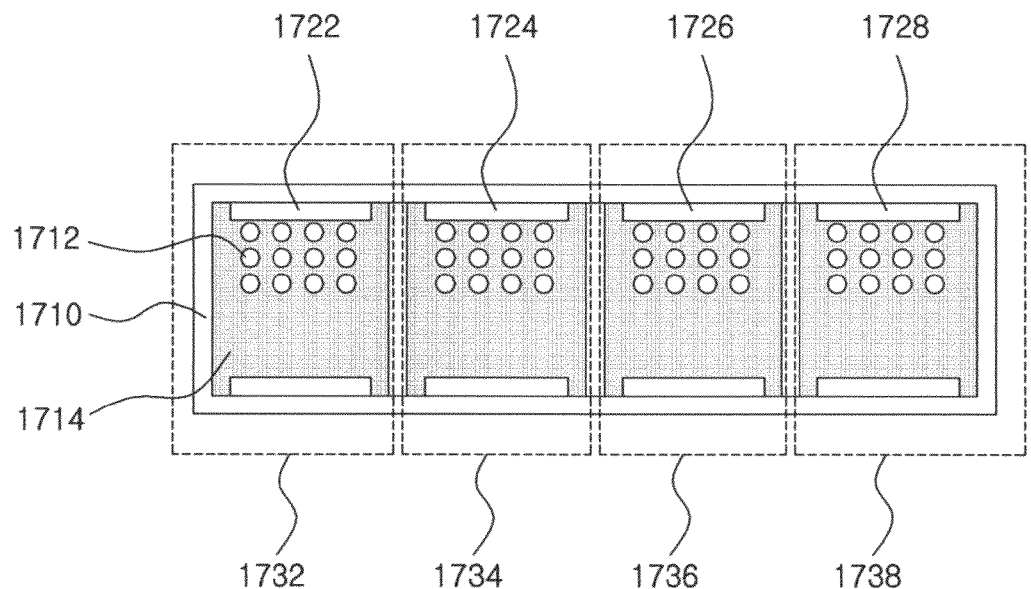
FIG. 17 is a view illustrating a configuration in which the particles and solvent included in the display device are partitioned into a plurality of cells in accordance with one embodiment of the present invention.

FIG. 17 is a view illustrating a configuration in which the particles and solvent included in the display device are partitioned into a plurality of cells in accordance with one embodiment of the present invention.

Referring to FIG. 17, the particles 1712 and solvent 1714 included in the display device 1700 can be isolated by partition walls or the like made of an insulating material and partitioned into cells 1732, 1734, 1736, and 1738. By partitioning the particles 1712 and the solvent 1714, direct interference, such as incorporation, between the particles 1712 and/or the solvent 1714 to be included in different cells can be prevented from occurring. Accordingly, the inter-particle distances of the particles contained in the display device 1700 can be independently controlled for each cell, and the particles can be prevented from being irregularly arranged due to electrohydrodynamic (EHD) motion of the particles having electric charges.

Meanwhile, unlike in FIG. 17, even if the electrodes and the cells are not disposed in a corresponding manner to each other but instead a region covered by electrodes is smaller than a cell or one cell is covered by two or more electrodes, an independent display can be implemented as desired for a given region of the display unit by using an electrode pattern. That is, when an electric field is applied to a specific region in a cell through one of the electrodes that covers the cell, only the solvent and/or particles existing in the specific region among the particles existing in the cell reacts with the electric field, but the particles and/or solvent existing in other regions does not react with the electric field. Thus, a region (i.e., display region) on which light of a specific wavelength is reflected can be determined by an electrode pattern, rather than by the size or pattern of the cells.

As mentioned above, by encapsulating the particles and the solvent or dispersing them in a medium or partitioning them, the inter-particle distances can be independently controlled for each capsule, each region, or each cell, thereby enabling more precise display and making the maintenance and repair of the display device easier.

Meanwhile, although the embodiments of FIGS. 12 to 17 have been described with respect to the case where both of the upper and lower electrodes are divided into a plurality of electrodes, either one of the upper and lower electrodes may be formed as a common electrode. For instance, in the actual application to display products, the upper electrode may be formed as a common electrode made of a transparent electrode material, while the lower electrode may be divided into unit cells and connected to a transistor for driving each cell and may not be made of a transparent electrode material.

Figure 18:
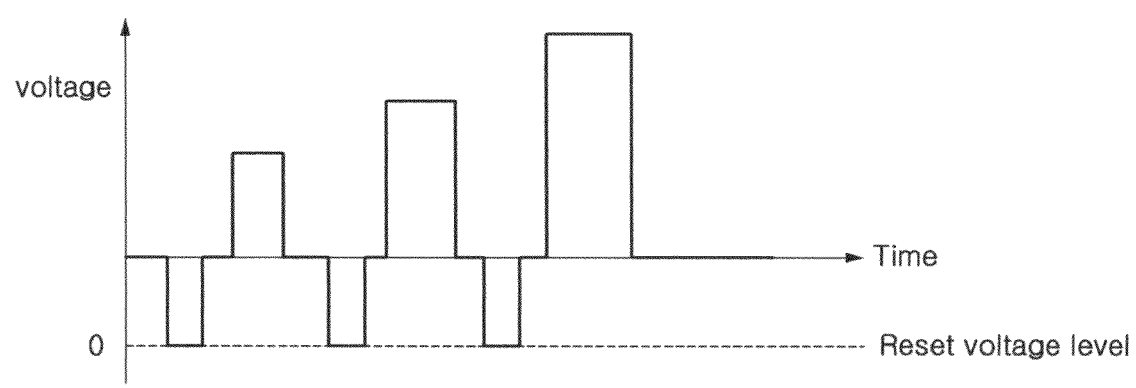
FIGS. 18 to 20 are views illustrating a pattern of voltages applied to the display device in accordance with one embodiment of the present invention.
Figure 19:
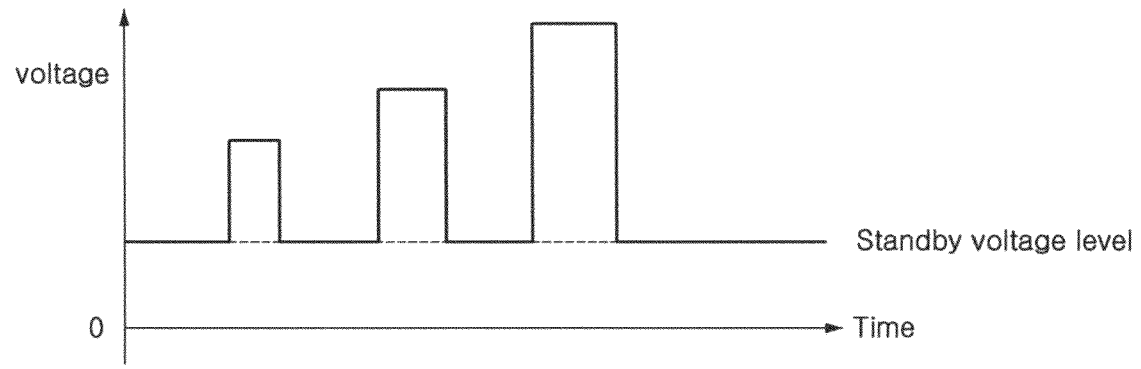
Figure 20:
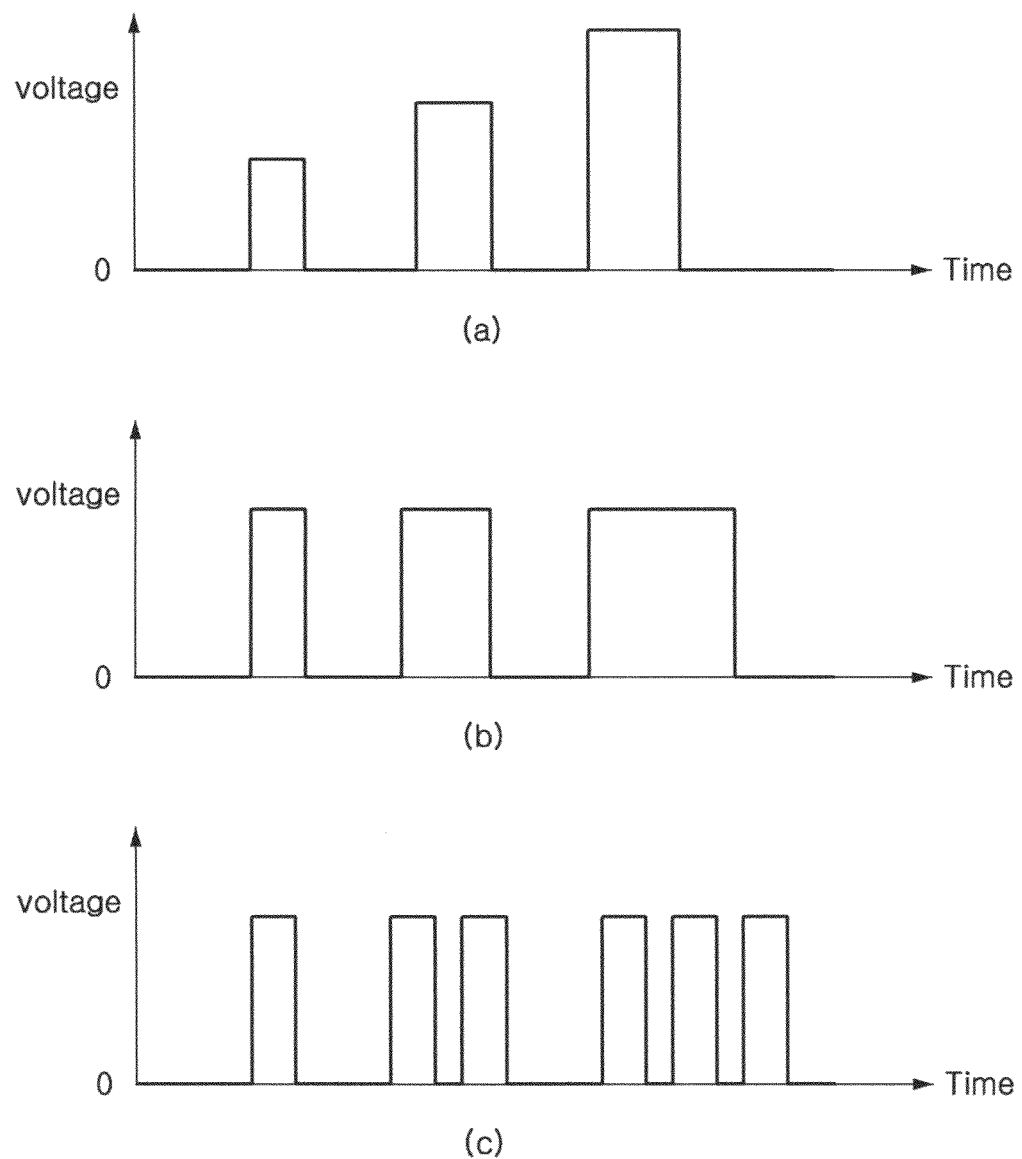

FIGS. 18 to 20 are views illustrating a pattern of voltages applied to the display device in accordance with one embodiment of the present invention.

First, referring to FIG. 18, the display device in accordance with one embodiment of the present invention may further include a control unit (not shown) that performs the function of resetting or initializing the inter-particle distances of the particles at times between the intervals of changing of the intensity and/or direction of an electric field when sequentially applying electric fields of different intensities and/or different directions to the dispersion including the particles and thus achieving a continuous display. More specifically, when sequentially applying a first voltage and a second voltage using the electric field generating and/or applying unit to the dispersion including the particles and the solvent, the control unit performs the function of bringing the inter-particle distances arranged at predetermined distances by the first voltage back to the initial or reset state by applying a reset voltage having the opposite polarity to the first voltage to the dispersion before applying the second voltage after the application of the first voltage. With this, the display device can improve display performance, including improving the operating speed and suppressing afterimages. Moreover, the reset voltage is applied with the opposite polarity to the just previously applied voltage. Therefore, even when the display device is turned off, the operating speed can be raised by forcibly moving the particles moved and arranged in a predetermined direction by the just previously applied voltage into the opposite direction.

Next, referring to FIG. 19, the display device in accordance with one embodiment of the present invention may further include a control unit (not shown) that performs the function of maintaining the inter-particle distances at predetermined distances (stand-by distances) in advance when sequentially applying electric fields of different intensities and different directions to the dispersion including the particles and the solvent and achieving a continuous display. More specifically, when sequentially applying a first voltage and a second voltage using the electric field generating and/or applying unit to the dispersion including the particles and the solvent, the control unit in accordance with one embodiment of the present invention performs the function of rapidly adjusting the inter-particle distances to desired inter-particle distances by applying a predetermined standby voltage in advance and then applying the first voltage or the second voltage. With this, the display device in accordance with one embodiment of the present invention can improve display performance, including increasing response speed and making screen change faster. That is, in the conventional electronic paper technology, particles of a specific color had to be moved to run through from one end to the opposite end in a cell in order to display a particular color. Contrastingly, in the present invention, photonic crystals can be realized in a manner that a standby voltage having a relatively low level enough not to make reflected light in a visible spectrum appear is applied to form the stand-by inter-particle distances not yet corresponding to the visible light, and then a voltage of a specific level or greater is applied to reflect light in the visible spectrum. Hence, photonic crystals for reflecting light in the visible spectrum can be realized just by moving the particles slightly, thereby making the operating speed of such a reflection-type display device faster.

Subsequently, referring to FIG. 20, the display device in accordance with one embodiment of the present invention may further include a control unit (not shown) that performs the function of applying an electric field of various patterns of the intensity, duration of application, etc. of the electric field when sequentially applying electric fields of different intensities and/or different directions to the dispersion and achieving a continuous display. More specifically, when applying a voltage using the electric field generating and/or applying unit to the dispersion including the particles and the solvent, the control unit in accordance with one embodiment of the present invention can increase or decrease the level of a voltage to a predetermined voltage (see (a) of FIG. 20), can extend or reduce the duration or period of application of a certain voltage (see (b) of FIG. 20), and can obtain the same effect as continuous application of a voltage by repeatedly applying a discontinuous pulse voltage (see (c) of FIG. 20). By doing so, the display device in accordance with one embodiment of the present invention can improve display performance, including enabling display of various patterns and reducing power consumption.

It should be noted, however, that the electric field application pattern in accordance with the present invention is not necessarily limited to those listed above, but may be appropriately changed within the scope of the objects of the present invention, i.e., within the scope in which the inter-particle distances can be controlled by an electric field.

Figure 21:
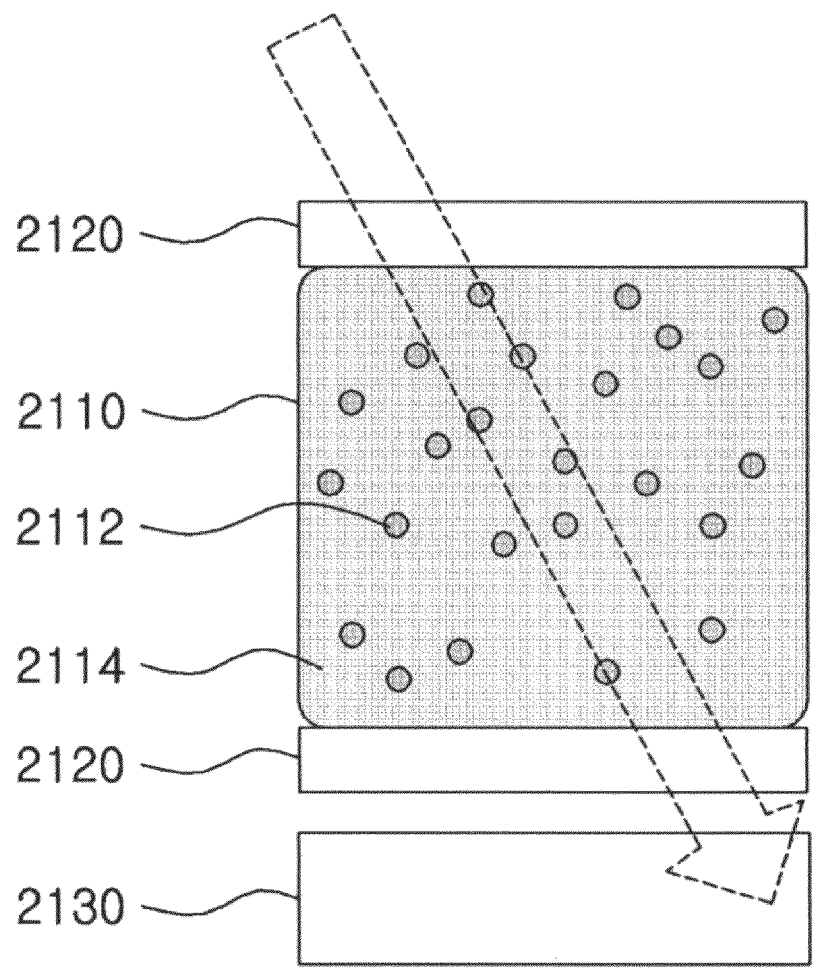
FIG. 21 is a view illustrating the configuration of a display device including a solar cell unit in accordance with one embodiment of the present invention.

FIG. 21 is a view illustrating the configuration of a display device including a solar cell unit in accordance with one embodiment of the present invention.

Referring to FIG. 21, a display device 2100 may further include a solar cell unit 2130 that performs the function of generating an electromotive force by using light transmitted through the display device 2100 and storing it. The electromotive force generated by the solar cell unit 2130 can be used to generate and apply a voltage using the electric field generating and/or applying unit 2120, whereby the display device 2100 can realize the above-described photonic crystal display without depending on an external power supply. However, a combination of the display device and the solar cell unit in accordance with the present invention is not necessarily limited to those listed above, but the electromotive force generated by the solar cell unit may be used for purposes other than driving the display device.

Figure 24:
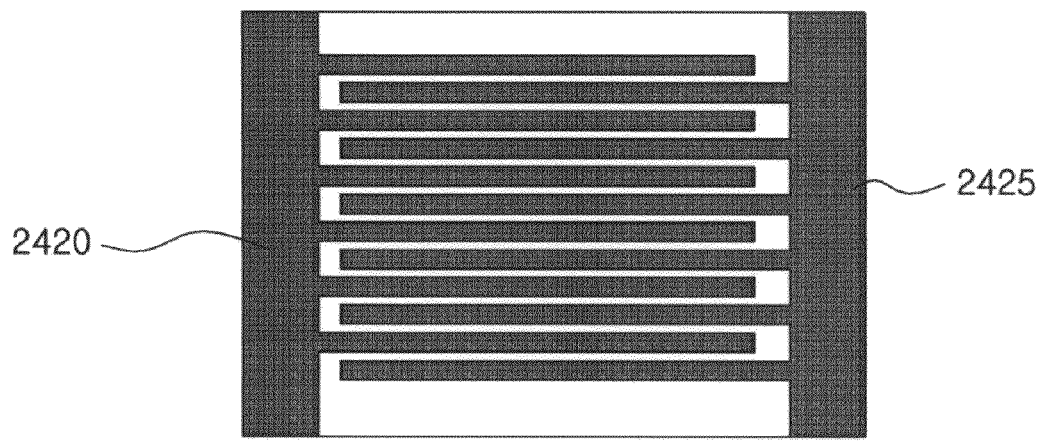

FIGS. 22 to 24 are views illustrating a configuration in which the electrodes constituting the electric field generating and/or applying unit are patterned in accordance with one embodiment of the present invention.

First, referring to FIG. 22, a lattice-shaped insulating layer 2230 can be formed on the lower electrode 2225 (or upper electrode 2220) of the electric field generating and/or applying unit, and thus the lower electrode 2225 (or upper electrode 2220) can be patterned at predetermined intervals.

In accordance with the display device shown in FIG. 22, the patterning interval of the electrodes is set approximately from several μm to several hundreds of μm, thereby preventing the particles from being irregularly arranged due to electrohydrodynamic (EHD) motion of the particles having electric charges and thus achieving uniform display. In particular, in accordance with the display device shown in FIG. 22, the particles can be effectively prevented from being biased by electrohydrodynamic motion without passing through a complicated process, such as encapsulation or cell partitioning, which requires a lot of time and cost.

Next, referring to FIG. 23, the lower electrode (or upper electrode) of the electric field generating and/or applying unit in accordance with one embodiment of the present invention may be divided into two electrodes (a first electrode 2320 and a second electrode 2325). More specifically, referring to FIG. 24, the first electrode 2420 and second electrode 2425 constituting the lower electrode (or upper electrode) of the electric field generating and/or applying unit can be patterned in the form of alternating teeth.

In accordance with the display device shown in FIGS. 23 and 24, it can be advantageous in terms of cost saving because electrodes can be formed only on one substrate, and the operating speed of the display device can be raised because the moving distance of the particles caused by application of an electric field is reduced.

It should be noted, however, that an electrode pattern in accordance with the present invention is not necessarily limited to those listed above, but may be appropriately changed within the scope of the objects of the present invention, i.e., within the scope in which the inter-particle distances can be controlled by an electric field.

Meanwhile, as the display device using photonic crystal characteristics operates on the principle that light of a specific wavelength among incident light is selectively reflected, it may not be easy to represent full black or full white by the display device using photonic crystal characteristics. The following description will be made about the configuration for displaying black or white by the display device using photonic crystal characteristics.

Figure 25:
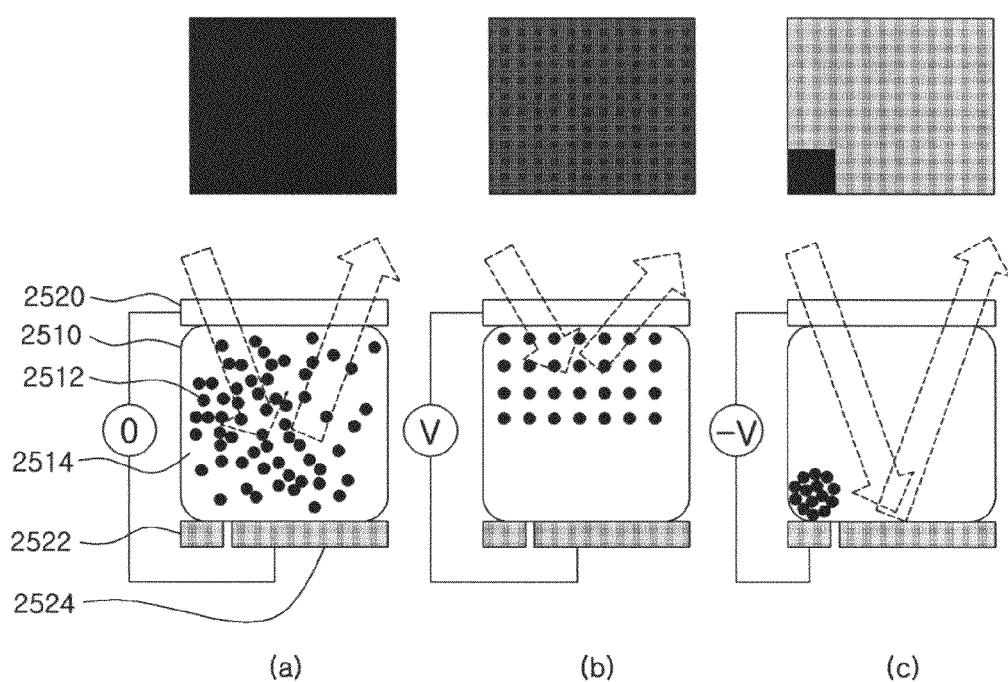
FIG. 25 is a view illustrating the configuration of a display device for displaying black or white in accordance with one embodiment of the present invention.

FIG. 25 is a view illustrating the configuration of a display device for displaying black or white in accordance with one embodiment of the present invention.

Referring to FIG. 25, a display unit 2510 may include black particles 2512, and an electric field generating or applying unit may include a transparent upper electrode 2520 and first and second lower electrodes 2522 and 2524 of white. First, if the intensity of an electric field applied to the display unit 2510 is less than a predetermined value or no electric field is applied, the particles 2512 may not form photonic crystals, but may reflect black, which is their own unique color, or reflect scattered light caused by the difference in refractive index between the particles and the solvent, thereby enabling the display unit 2510 to display black (see (a) of FIG. 25). Although not shown in FIG. 25, the black particles 2512 can be arranged in close contact with the upper electrode 2520 by applying an electric field above a threshold value to the display unit 2510. In this case, too, the display unit 2510 is able to display black. Next, if an electric field of an appropriate intensity is applied to the display unit 2510, light of a certain, desired wavelength range can be reflected from the particles 2512 forming photonic crystals (see (b) of FIG. 25). And then, if an electric field above a predetermined intensity is applied to the display unit 2510, the magnitude of electrical attraction that causes electrophoresis becomes too large, and thus the inter-particle distances 2512 are not maintained at appropriate distances and the particles 2512 may be drawn to one side. For instance, if an electric field above a predetermined value is applied only to the portion of the first lower electrode 2522, all the particles 2512 included in the display unit 2510 do not form photonic crystals but may be drawn to a narrow region covered by the first lower electrode 2522. Therefore, the second lower electrode 2524 can reflect white, which is its own unique color, without being affected by the black particles 2512, and thus the display unit 2510 can display white (see (c) of FIG. 25).

However, although the embodiment of FIG. 25 has been described with respect to the case where the colors of the particles and the electrodes are specified to black and white, the present invention is not necessarily limited thereto but the colors of the particles and the electrodes applicable to the display device of the present invention can be changed as desired and, further, can be set to be transparent. The following description will be made about the configuration for achieving a transparent display by the display device using photonic crystal characteristics.

Figure 26:
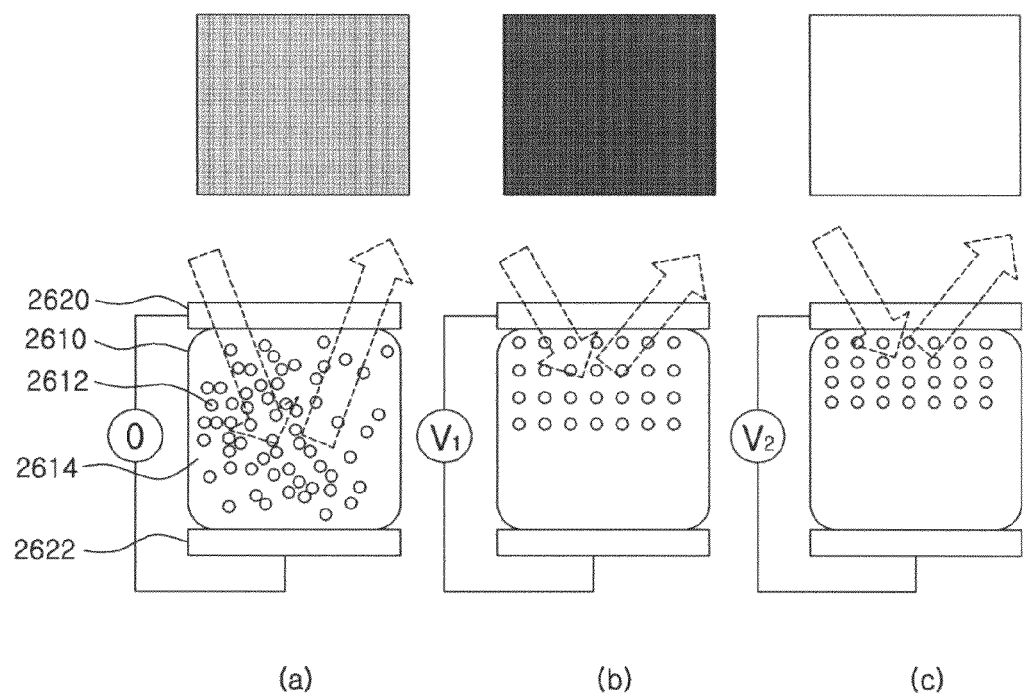
FIG. 26 is a view illustrating the configuration of a display device for achieving a transparent display in accordance with one embodiment of the present invention.

FIG. 26 is a view illustrating the configuration of a display device for achieving a transparent display in accordance with one embodiment of the present invention.

Referring to FIG. 26, a display unit 2610 may include transparent particles 2612 containing a visible light transmitting material, such as $SiO_x$, and an electric field generating and/or applying unit may include an upper electrode 2620 and a lower electrode 2622 that are also transparent. First, if the intensity of an electric field applied to the display unit 2610 is less than a predetermined value or no electric field is applied, the particles 2612 may not form photonic crystals and represent colors produced by photonic crystals and may scatter incident light due to the difference in refractive index between the particles and the solvent (see (a) of FIG. 26). Next, if an electric field of an appropriate intensity is applied to the display unit 2610, light of a certain, desired wavelength range can be reflected from the particles 2612 forming photonic crystals (see (b) of FIG. 26). And then, if an electric field above a preset intensity is applied to the display unit 2610, the magnitude of electrical attraction that causes electrophoresis becomes too large, and thus the inter-particle distances 2612 can reflect only light of a wavelength range (e.g., ultraviolet spectrum) shorter than the visible spectrum. That is, in this case, light in the visible spectrum is not reflected by photonic crystals but transmitted so the upper electrode 2620, the lower electrode 2622, and the particles 2612 all become transparent, and thus the display device of FIG. 26 becomes entirely transparent (see (c) of FIG. 26).

Meanwhile, although not shown concretely in FIG. 26, in (c) of FIG. 26, if an electrode having a specific color is used as the lower electrode, the color of the lower electrode may be displayed because light in the visible spectrum is not reflected by photonic crystals but transmitted and then reflected with the lower electrode.

That is, in the display device in accordance with the present invention, if a voltage below a specific level is applied, incident light is scattered and becomes translucent or opaque, if a voltage of a specific range is applied, incident light in the visible spectrum is reflected by regular arrangement (i.e., photonic crystals) of the particles to thereby display a predetermined color, and if a voltage exceeding a specific level is applied, the inter-particle distances become too narrow. Hence, incident light in the visible spectrum is transmitted, and incident light in the ultraviolet spectrum having a wavelength range shorter than the visible spectrum is reflected and becomes transparent. Therefore, according to the display device in accordance with the present invention, it is possible to make the color changing glass or the like where not only the light of a certain wavelength range can be reflected, but also it may become transparent or opaque. Further, it is possible to implement a display system, which makes a specific color or pattern, present on one side with respect to the display device, visible, or invisible to an observer placed at the other side by adjusting the transparency of the display device.

Figure 27:
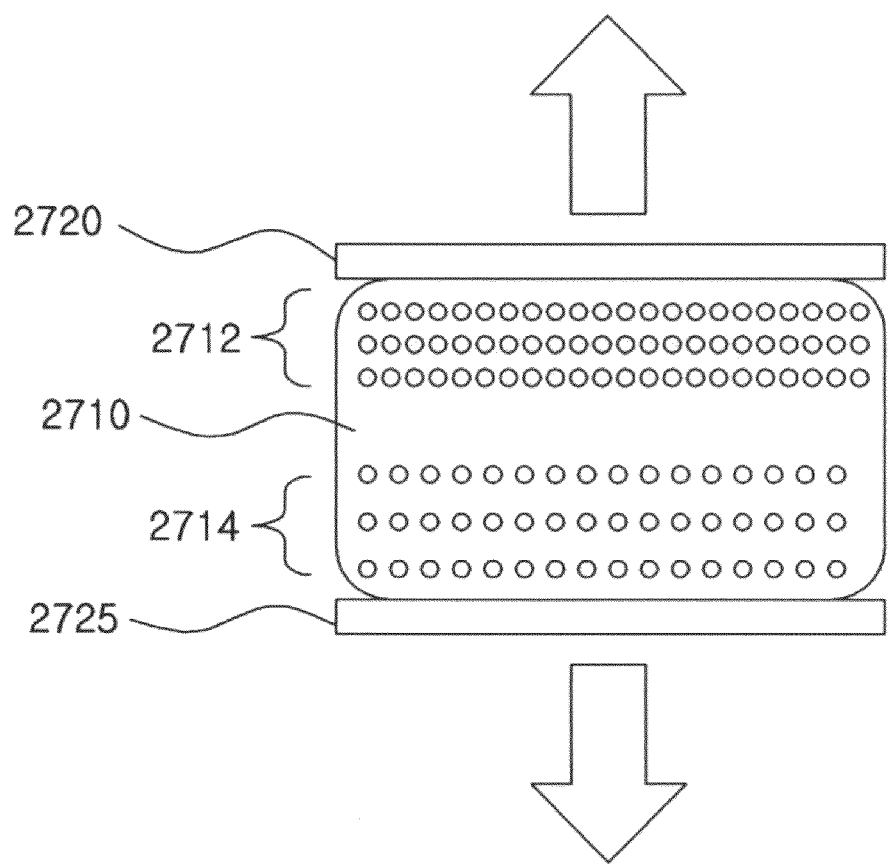
FIG. 27 is a view illustrating the configuration of a display device for realizing a photonic crystal display using particles having different electric charges from each other in accordance with one embodiment of the present invention.

FIG. 27 is a view illustrating the configuration of a display device for realizing a photonic crystal display using particles having different electric charges in accordance with one embodiment of the present invention.

First, referring to FIG. 27, a display unit 2710 of a display device 2700 may include particles having different electric charges, i.e., one type of particles 2712 having negative charges and the other type of particles 2714 having positive charges. As an electric field is applied to the display unit 2710, the particles 2712 having negative charges, and the particles 2714 having positive charges may be respectively moved in the opposite direction and regularly arranged. For instance, if an upper electrode 2720 of the electric field generating and/or applying unit is a positive electrode and a lower electrode 2725 thereof is a negative electrode, the particles 2712 having negative charges and the particles 2714 having positive charges may be moved in the upper electrode 2720 direction and in the lower electrode 2725 direction, respectively, and arranged as photonic crystals while maintaining predetermined inter-particle distances. In this case, the display device 2700 can reflect light of a certain wavelength range against both sides (i.e., the side of the upper electrode 2720 and the side of the lower electrode 2725) and thus can realize a double-sided display. Furthermore, if the charge amount of the particles 2712 having negative charges and the charge amount of the particles 2714 having positive charges are different from each other, as an electric field is applied, the inter-particle distances of the particles 2712 having negative charges and the inter-particle distances of the particles 2714 having positive charges may differ from each other. Thus, the display device 2700 can reflect light of different wavelength ranges against both sides, and thus can realize a display, both sides of which are controlled independently from each other.

Meanwhile, as explained with reference to FIG. 25, the particles 2712 having negative charges and particles 2714 having positive charges that are included in the display device 2700 of FIG. 27 may have their unique colors. In this case, different colors can be displayed on the upper and lower parts of the display device just by adjusting the polarity of an electric field applied to the upper electrode 2720 and the lower electrode 2725. For instance, assuming that the particles 2712 having negative charges are in black and the particles 2714 having positive charges are in white, when a positive voltage is applied to the upper electrode 2720, the black particles 2712 having negative charges may be moved toward the upper electrode 2720 to display black on the upper part of the display device. When a negative voltage is applied to the upper electrode 2720, the white particles 2714 having positive charges may be moved toward the upper electrode 2720 to display white on the upper part of the display device. In line with this, the particles 2712 having negative charges and the particles 2714 having positive charges may also form photonic crystals to thereby reflect light of a certain wavelength. Thus, white and black can be displayed on the same cell, and reflected light of a certain wavelength range can be displayed as well.

Figure 28:
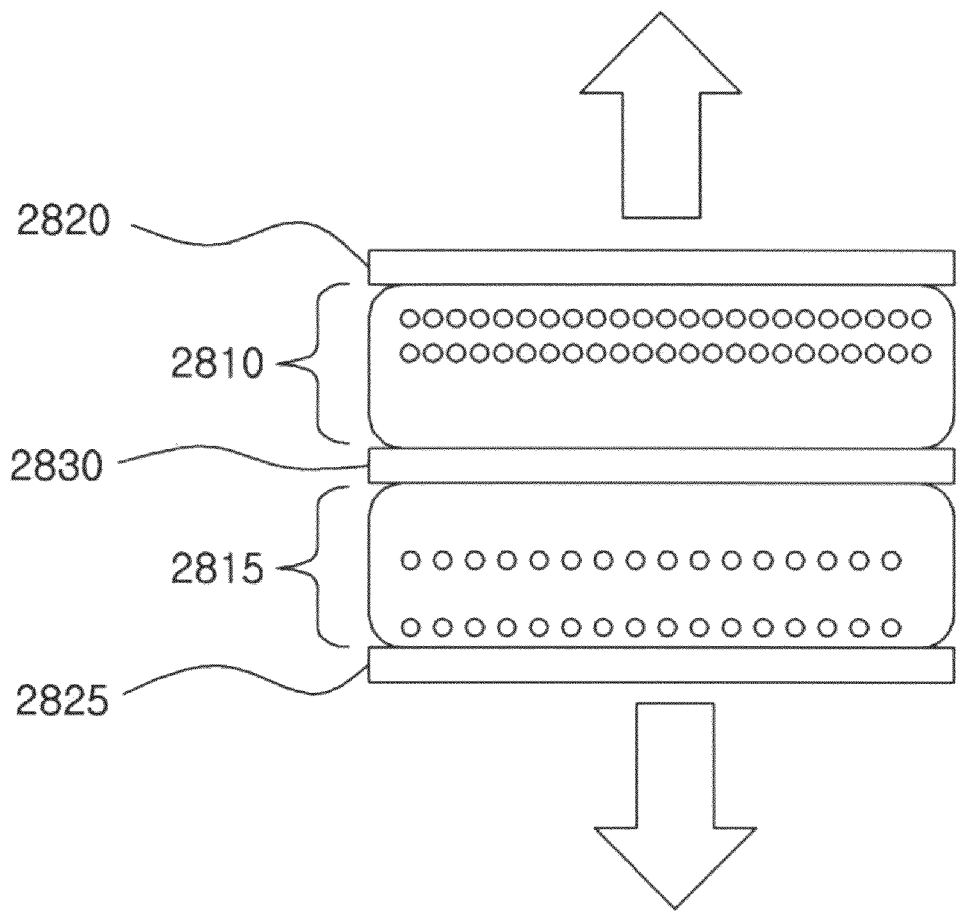
FIG. 28 is a view illustrating the configuration of a display device for realizing a dual-sided photonic crystal display using an electrode for applying a ground voltage in accordance with one embodiment of the present invention.

FIG. 28 is a view illustrating the configuration of a display device for realizing a dual-sided photonic crystal display using an electrode for applying a ground voltage in accordance with one embodiment of the present invention.

Referring to FIG. 28, a display device 2800 may include a ground electrode 2830 for applying a ground voltage between an upper electrode 2820 and a lower electrode 2825. As different voltages are applied to the upper electrode 2820 and the lower electrode 2825 respectively, electric fields having different directions and magnitudes can be independently applied to a space between the upper electrode 2820 and the ground electrode 2830 and a space between the lower electrode 2825 and the ground electrode 2830, respectively. Therefore, particles present in a first display unit 2810 located between the upper electrode 2820 and the ground electrode 2830 and particles present in a second display unit 2815 located between the lower electrode 2825 and the ground electrode 2830 can be controlled independently from each other. Thus, the display device 2800 can reflect light of different wavelengths against both sides (i.e., the side of the upper electrode 2820 and the side of the lower electrode 2825), and accordingly can realize a display, both sides of which are controlled independently from each other.

Hereinafter, a description will be given on a display method and device using photonic crystal characteristics in accordance with another embodiment of the present invention, in which an electric field is applied to the dispersion including particles having electric charges and a solvent to control inter-particle distances to thereby reflect light of a certain wavelength range.

Like the display device 900 in accordance with one embodiment of the present invention shown in FIG. 9, a display device (not shown) in accordance with another embodiment of the present invention may include a display unit and an electric field generating and/or applying unit, and the display unit may include a plurality of particles having electric charges, dispersed in a certain solvent.

In accordance with another embodiment of the present invention, if an electric field is applied to the particles, electrical attraction of a predetermined direction acts on the particles due to the electric charges of the particles, and the particles are drawn to one side by electrophoresis, thus narrowing the inter-particle distances. On the contrary to this, as electrical repulsion acts between the particles having the electric charges of the same sign, the inter-particle distances do not become continuously narrower and reach a predetermined equilibrium state. Therefore, the inter-particle distances can be determined depending on the relative strength of electrical attraction caused by the electric field and the electrical attraction between the particles having electric charges of the same sign, and thus the plurality of particles arranged at predetermined intervals can function as photonic crystals. That is, because the wavelength of light reflected from the plurality of regularly arranged particles is determined by the distances between the particles, the wavelength of light reflected from the particles can be changed by controlling the distances between the particles.

Meanwhile, it should be noted that the configurations and embodiments described above with reference to FIGS. 12 to 23 are also applicable to the display device in accordance with another embodiment of the present invention.

The following is a description of a display method and device using photonic crystal characteristics in accordance with still another embodiment of the present invention, in which an electric field and/or magnetic field is applied to the dispersion particles having electric charges and magnetism or magnetic property and a solvent to control inter-particle distances of the particles and thus reflect light of a certain wavelength range.

In accordance with still another embodiment of the present invention, there is provided a display device in which an electric field and/or magnetic field is applied to the dispersion including the solvent and the particles having electric charges and magnetism or magnetic property to control the inter-particle distance. The inter-particle distances of the particles having magnetism or magnetic property can be controlled by a magnetic field on the same principle as the inter-particle distances of the particles having electric charges are controlled by an electric field. Therefore, a detailed description of the operating principle will be omitted. In accordance with still another embodiment of the present invention, the particles having electric charges and magnetism may include a super-paramagnetic material or magnetic nano-particles, such as iron (Fe) oxide, nickel (Ni) oxide, and cobalt (Co) oxide, in addition to a material having electric charges. It should be noted, however, that the composition of the particles in accordance with still another embodiment of the present invention is not limited those listed above but may be appropriately changed within the scope of the objects of the present invention.

More specifically, in accordance with still another embodiment of the present invention, in a state where a display for displaying a specific color on the display unit is realized by applying a predetermined electric field to a display unit including particles having electric charges and magnetism, if a magnetic field having a predetermined direction and magnitude is applied to a partial region of the display unit, the color displayed on the corresponding partial region of the display unit can be changed. Additionally, in accordance with still another embodiment of the present invention, in a state where a display for displaying a specific color on a partial region of the display unit is realized by applying a magnetic field having a predetermined direction and magnitude to the partial region of a display unit including particles having electric charges and magnetism, if an electric field having a predetermined direction and magnitude is applied to the entire region of the display unit, a display over the entire area of the display unit may be reset. That is, with the display device in accordance with still another embodiment of the present invention, the inter-particle distances can be controlled using a magnetic field, as well as an electric field, and therefore a display control method can be diversified.

FIG. 29 is a view illustrating the configuration of a display device in accordance with still another embodiment of the present invention.

Referring to FIG. 29, a display device 2900 in accordance with still another embodiment of the present invention may include a display unit 2910 including particles 2912 having electric charges and magnetism, electric field generating and/or applying units 2922, 2924, and 2926 for applying an electric field to the display unit 2910, and a magnetic field generating and/or applying unit 2930 for applying a magnetic field to the display unit 2910. The magnetic field applying unit 2930 may include an electromagnet 2932 and a coil 2934 to control the intensity and direction of the magnetic field applied to the display unit 2910. In addition, the magnetic field applying unit 2930 may take the form of a stimulus fixed and installed at a specific region of the display device 2900, or may take the form of a pen so as to be manipulated by a user to apply a magnetic field to a given or desired region on the display unit 2910.

Referring to FIG. 29, the particles 2912 located in between the first electrodes 2922 to which no voltage is applied may be irregularly arranged, the particles 2912 located in between the second electrodes 2924 to which a voltage is applied may be regularly arranged while maintaining predetermined inter-particle distances by the electric field applied into between the second electrode 2924. The particles 2912 affected by the magnetic field applied by the magnetic field generating and/or applying unit 2930, as well as by the electric field applied by the third electrode 2926, may be arranged more densely or more sparsely in a regular way than the particles 2912 located in between the second electrode 2924.

Continually, referring to FIG. 29, the magnetic field applying unit 2930 may include an electromagnet 2932 having a coil 2934 wound therearound to generate a magnetic field generated by induction current and a power supply (not shown) for flowing current in the coil 2934. With this configuration, since the intensity of the magnetic field induced from the coil 2934 and produced by the electromagnetic field 2932 can be varied by adjusting a change in the current supplied to the coil 2934. Thus, the inter-particle distances of the particles contained in the display unit 2910 can be controlled variously and finely, and, as a result, a display for displaying a structural color over the full wavelength range on the display unit 2910 can be realized.

Moreover, referring to FIG. 29, the magnetic field applying unit 2930 in accordance with such a still another embodiment of the present invention can perform the "erase" function of resetting the display realized on the display unit 2910, as well as the "write" function of realizing a display of various colors on the display unit 2910. That is, in accordance with this still another embodiment of the present invention, by varying the intensity and direction of current flown to the coil 2934 mounted on the magnetic field generating and/or applying unit 2930, the inter-particle distances of the particles contained in the display unit 2910 may be set to specific distances, or, on the contrary, the inter-particle distances of the particles contained in the display unit 2910 may be reset or initialized. Therefore, with the display device 2900, it is possible to realize a color board having various background colors together with functions of writing and/or erasing of characters in various colors on the background, as well as a display for displaying a structural color over the full wavelength range.

Meanwhile, it should be noted that the configurations and embodiments described above with reference to FIGS. 12 to 23 are also applicable to the display device in accordance with still another embodiment of the present invention.

Experimental Results

Figure 31:
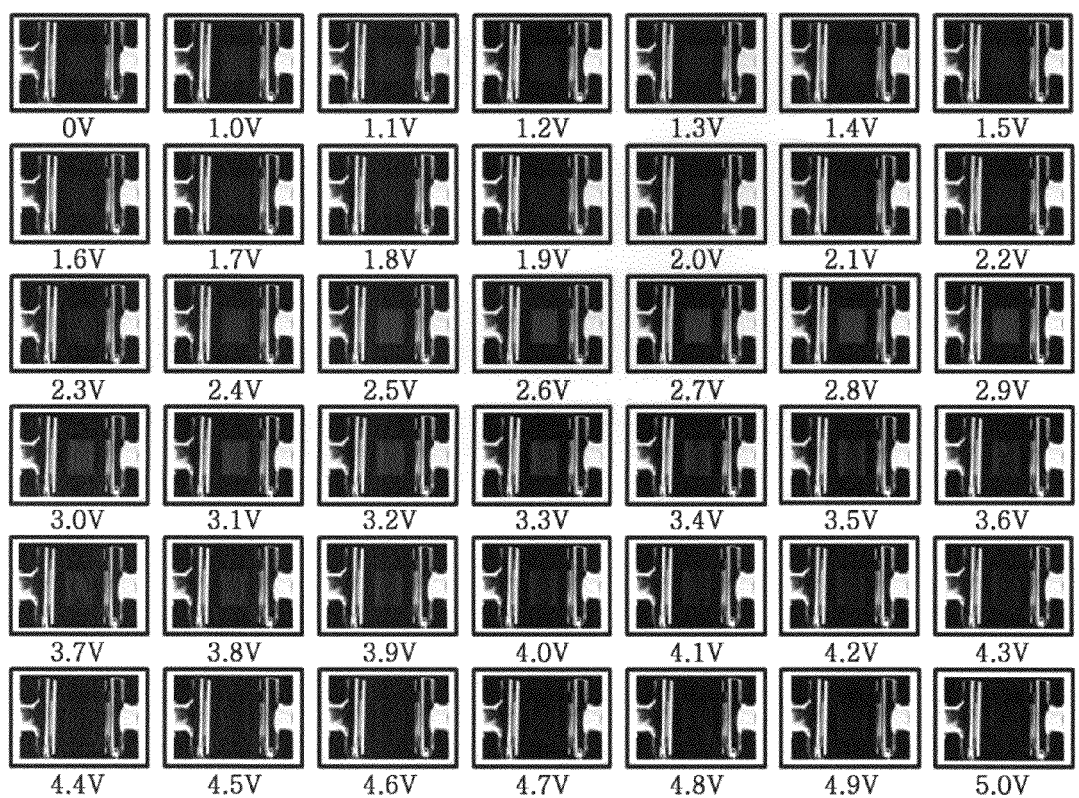

First, FIGS. 30 and 31 are graphs and photographs showing light reflected from the particles as a result of performing an experiment for the application of an electric field when the particles having electric charges are dispersed in a solvent having electrical polarization characteristics in accordance with one embodiment of the present invention. For reference, in the experiment of FIGS. 30 and 31, particles having a size of 100 to 200 nm, charged with negative charges and coated with a silicon oxide film were used as the particles having electric charges, a solvent having a polarity index greater than 1 was used as the solvent having electrical polarization characteristics. The intensity of a voltage applied to apply an electric field to the dispersion including the particles, and the solvent was set variously in the range of 0 to 5 V. Meanwhile, the graphs shown in FIG. 30 depict the reflectance of light reflected from the particles in the wavelength range of the visible light spectrum when electric fields of various intensities are applied. From FIG. 30, it can be seen that the greater the degree of change in the wavelength pattern of reflected light with change in the intensity of an electric field, the larger the change in the inter-particle distances. This means that light of more various wavelengths can be reflected from the particles by controlling the intensity of the electric field.

Referring to FIG. 30, it can be seen that a wavelength pattern of light reflected from particles depends on the intensity of an applied electric field (i.e., intensity of a voltage). More specifically, it can be seen that, the higher the intensity of an applied electric field (i.e., intensity of a voltage), the shorter the wavelength of the light reflected from the particles on the whole. According to the experiment result of FIG. 30, it can be seen that the higher the intensity of an applied electric field (i.e., intensity of a voltage), the more the color of the light reflected from the particles changes to blue from red. Referring to FIG. 31, the aforementioned change in the color of the reflected light can be visually verified.

Next, FIGS. 32 and 33 are graphs showing the wavelength of light reflected from the particles as a result of performing an experiment for the application of an electric field when the particles having electric charges are dispersed in various solvents having different polarity indices in accordance with one embodiment of the present invention. For reference, in the experiment of FIGS. 32 and 33, particles having a size of 100 to 200 nm, charged with negative charges and coated with a silicon oxide film were used as the particles having electric charges, and solvents having polarity indices of 0, 2, 4, and 5 were used as the solvent having electrical polarization characteristics. More specifically, the graphs (a), (b), (c), and (d) of FIG. 32 depict experimental results for the solvents having polarity indices of 0, 2, 4, and 5, respectively, and the graphs (a), (b), (c), and (d) of FIG. 33 depict experimental results for a solvent obtained by mixing a solvent having a polarity index of 0 and a solvent having a polarity index of 4 at ratios of 90:10, 75:25, 50:50, and 0:100, respectively. Meanwhile, the graphs shown in FIGS. 32 and 33 depict the reflectance of the light reflected from the particles in the wavelength range of a visible light spectrum when electric fields of various intensities are applied. The greater the degree of change in the wavelength pattern of reflected light with change in the intensity of an electric field, the larger the change in the inter-particle distances. This means that light of more various wavelengths can be reflected from the particles by controlling the intensity of the electric field.

Referring to FIG. 32, from graph (a) showing the experimental result for the solvent having a polarity index of 0, it can be seen that a change in the intensity of an electric field (i.e., intensity of a voltage) causes almost no change in the wavelength pattern of reflected light between the different voltages. It can be seen that the higher the polarity index (i.e., as the experimental results proceed toward graph (d) from graph (a)), the greater the change in the wavelength pattern of reflected light with changes in the intensity of an electric field (i.e., intensity of a voltage). Further, referring to FIG. 33, it can be seen that, the higher the ratio of the solvent having a high polarity index (i.e., as the experimental results proceed toward graph (d) from graph (a)), the greater the changes in the wavelength pattern of reflected light with changes in the intensity of the electric field (i.e., intensity of a voltage).

From the experimental results discussed above, it can be seen that, with the display device in accordance with one embodiment of the present invention, photonic crystals capable of reflecting light of a certain wavelength can be realized by properly adjusting the charge amount and/or polarization amount of the particles, the polarization amount of the solvent, and/or the intensity of an applied electric field, and accordingly a display of a certain wavelength range (full spectrum) can be realized.

Next, FIGS. 34 and 35 are graphs and photographs showing light reflected from the particles as a result of performing an experiment for the application of an electric field when the particles having electric charges and electrical polarization characteristics are dispersed in a solvent in accordance with one embodiment of the present invention. For reference, in the experiment of FIGS. 34 and 35, $SrTiO_3$ particles (see (a) of FIG. 34) and $BaTiO_3$ particles (see (b) of FIG. 34), both of which are charged with electric charges, were used as the particles having electric charges and electrical polarization characteristics, and the particles were dispersed in a solvent having a polarity index of 0.

Referring to FIG. 34, it can be seen that the higher the intensity of an electric field applied to the particles and the solvent, the lower the reflectance of light on the whole. From this experimental result, it can be concluded that upon application of an electric field, the particles dispersed in the solvent can be electrically polarized and arranged in the direction of the electric field (see (b) of FIG. 35), and this arrangement leads to a decrease in the number of particles capable of reflecting incident light and reduces the reflectance of light. Although this experiment does not involve a sharp change in the wavelength of reflected light which will be produced using a configuration in which an electric field is applied when particles having electrical polarization characteristics are dispersed in a nonpolar solvent, it was found that the particles are arranged in a constant direction as the electric field is applied. From this, it can be concluded that the wavelength of reflected light can be varied by optimizing the conditions, such as electric charges on the particle surfaces.

Next, FIG. 36 is a view showing experimental results for the configuration for realizing a transparent display in accordance with one embodiment of the present invention. For reference, in this experiment, particles, a solvent, and electrodes that are made of a transparent material that transmits light in a visible spectrum were used, and the degree of transparency of display was visually observed while gradually increasing the intensity of an electric field applied to the display device using photonic crystals.

Referring to FIG. 36, if the intensity of an electric field is relatively low, it can be seen that a predetermined color was displayed on the display device as light of a visible spectrum is reflected by photonic crystals (see (a) and (b) of FIG. 36). However, if the intensity of an electric field is relatively high, it can be seen that the color displayed on the display device became noticeably lighter as the wavelength range of light reflected by photonic crystals is gradually shifted from the visible spectrum to the ultraviolet spectrum (see (c) of FIG. 36). If the intensity of an electric field becomes much higher, it can be seen that the display device turns into a transparent state while displaying no color as the wavelength range of light reflected by photonic crystals is completely out of the visible spectrum (see (d) and (e) of FIG. 36). Using this characteristic, the display device in accordance with the present invention may be utilized as smart glass, such as color changing glass.

Figure 37:
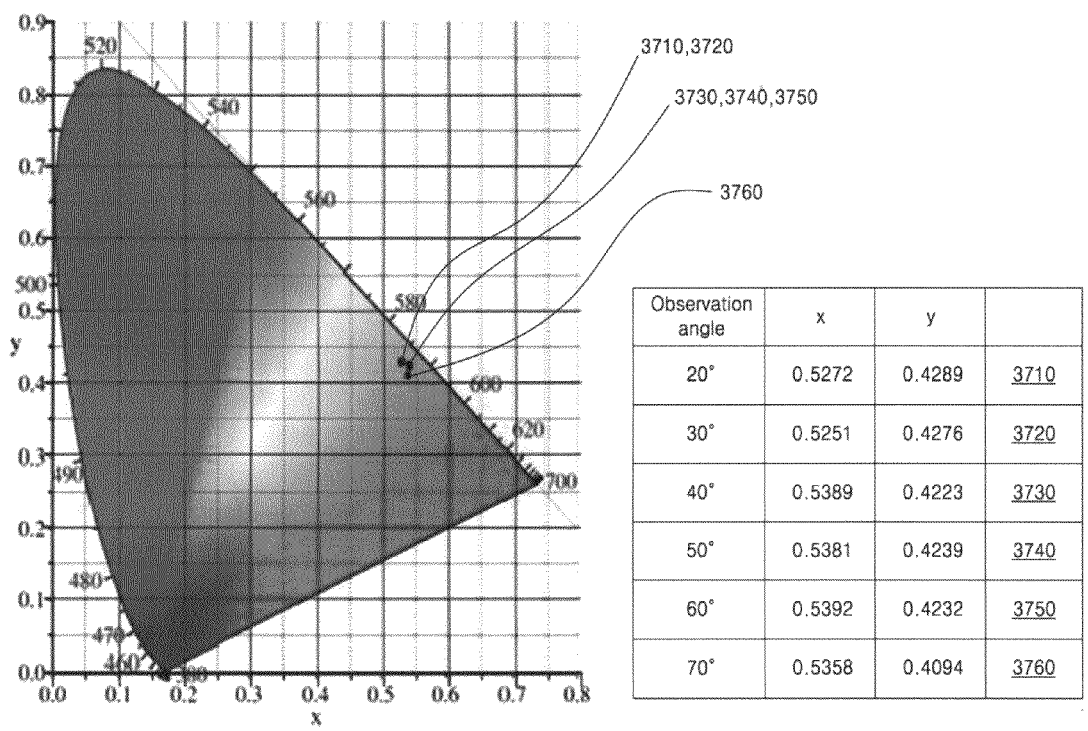
FIG. 37 is a view showing a result of an experiment of the performance of a display varying with the view angle of the display device (i.e., an experimental result for the viewing angle of a display) in accordance with one embodiment of the present invention.

FIG. 37 is a view showing a result of an experiment of the performance of a display varying with the observation angle of the display device (i.e., an experimental result for the viewing angle of a display) in accordance with one embodiment of the present invention.

Referring to FIG. 37, it can be seen that even if the observation angle of the display device in accordance with one embodiment of the present invention varies from 20° to 70°, almost no change was observed in the color patterns 3710 to 3760 of reflected light. It was found that, while the conventional photonic crystal display device has the disadvantage of showing a significant change in color pattern depending on the observation angle, the display device in accordance with the present invention has the advantage of showing a constant color pattern without almost any change in color pattern depending on the observation angle. It is understood that this advantage derives from the fact that the photonic crystals formed by the display device in accordance with the present invention are quasi crystals having a short range order. Accordingly, the display device in accordance with the present invention can greatly improve display performance in comparison with the conventional display device which merely forms photonic crystals having a long range order.

Figure 38:
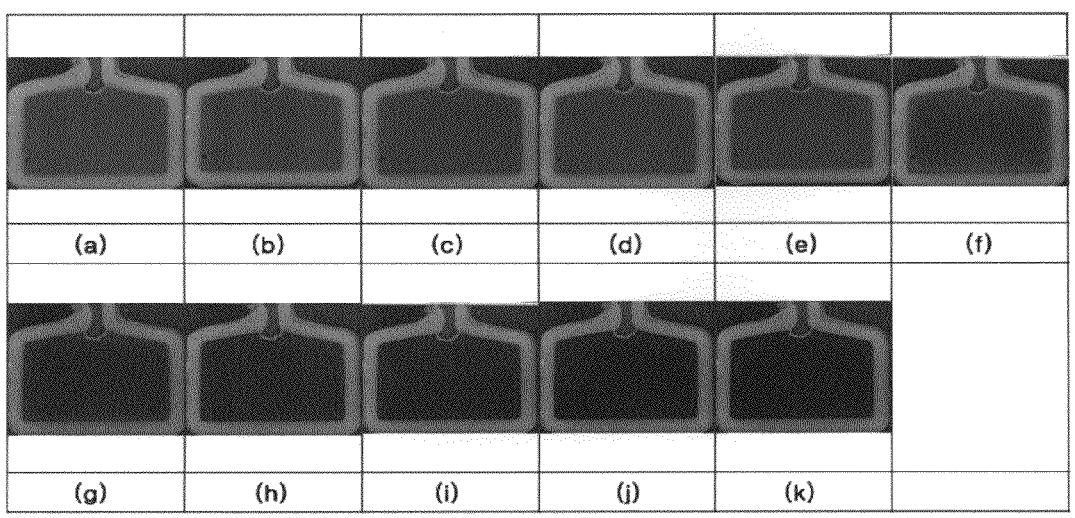
FIGS. 38 and 39 are views showing results of actually realizing a display by applying an electric field and a magnetic field to particles having electric charges and magnetism in accordance with still another embodiment of the present invention.
Figure 39:
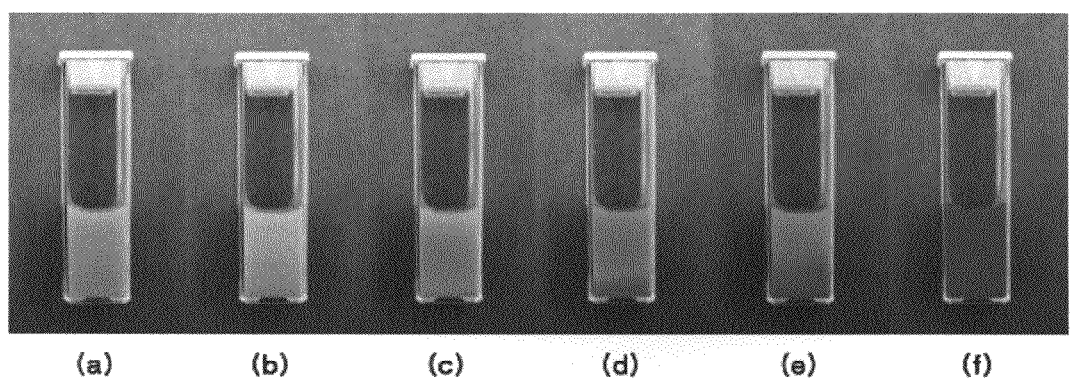

Meanwhile, FIGS. 38 and 39 are views showing results of actually realizing a display by applying an electric field (FIG. 38) and a magnetic field (FIG. 39) to particles having electric charges and magnetism in accordance with still another embodiment of the present invention. For reference, in this experiment, particles including iron oxide ($Fe_3O_4$; magnetite) and coated with silicon oxide ($SiO_x$) having negative charges were used as the particles, and these particles, which are dispersed in a solvent, were injected into the display device.

First, in the experiment of FIG. 38, indium tin oxide, which is one of light transmissive electrode materials, was used as the material of the electrode for applying an electric field. In addition, in this experiment, particles having negative charges are arranged, biased toward the upper electrode, by applying a positive voltage to the upper electrode of the display device. Meanwhile, in this experiment, voltages of 0 V, 1 V, 2 V, . . . , 10 V were sequentially applied to the electrode of the display device, and the color of light reflected from the display device upon application of the voltage of 0 to 10 V were as shown in (a) to (k) of FIG. 38, respectively.

Referring to FIG. 38, it can be seen that, while no particular color change was observed if a relatively low voltage of 0 to 4 V was applied, a distinct color change was observed if a relatively high voltage of 5 to 10 V was applied. Particularly, the higher the applied voltage, the more the color observed in the display device changes to blue from green. It would be considered that this is because the inter-particle distances become closer with an increase in the magnitude of the electrical attraction (i.e., a force that causes electrophoresis) acting on the particles due to the electric field, and thus the wavelength of light reflected from the particles becomes shorter (see (a) to (k) of FIG. 38).

Next, in the experiment of FIG. 39, the intensity of a magnetic field applied to the display device was gradually increased by gradually decreasing the distance between a permanent magnet for generating a magnetic field and the display device.

Referring to FIG. 39, it can be seen that the wavelength of the light reflected from the display device varies with a change in the intensity of a magnetic field. More specifically, it can be seen that the lower the intensity of a magnetic field, the longer the wavelength of reflected light of red, and the higher the intensity of a magnetic field, the shorter the wavelength of reflected light of blue.

From the experimental results of FIGS. 38 and 39, the inter-particle distances can be changed independently by applying an electric field and/or magnetic field to the display device. Using this characteristic, it is possible to manufacture a unique display device which uses an electric field to erase a display realized by a magnetic field, or, on the contrary, uses a magnetic field to form a certain pattern on a display realized by an electric field.

As explained above, with the display device in accordance with the present invention, a structural color over the full wavelength range can be realized by controlling the inter-particle distances of the particles having electric charges to thus control the wavelength of light reflected from the particles. Moreover, with the display device in accordance with the present invention, various and precise displays can be realized by independently controlling the particles having electric charges, and the effect of making the maintenance and repair of the display device easier can be achieved. In particular, as compared with the existing displays, such as an electronic ink, that can only display a specific color and requires the use of a separate color filter to display a color different from the specific color, the efficiency of the display device in accordance with the present invention lies in that it can realize a display for effectively displaying a structural color over the full wavelength range without the use of a separate color filter.

Although the above embodiments have been described focusing on the display device using photonic crystal characteristics, the configuration of the present invention is applicable in various fields, including color changing glass, color changing wallpapers, color changing solar cells, color changing sensors, color changing papers, color changing ink, anti-counterfeit tags, and so on. For example, using this concept, it is possible to manufacture a portable biosensor capable of detecting a chemical reaction without expensive measurement equipment by converting a chemical signal obtained from the chemical reaction into an electric signal and displaying the electric signal in a certain color. Also, if a material whose phase can be changed by light, heat, pressure, etc. is used as the solvent used for the display device of the present invention, electronic paper, electronic ink, etc. that reflect a certain color in a stable and fixed manner can be realized. Moreover, by incorporating a material, such as a phosphor material or quantum dot (QD) material, in the particles or solvent contained in the display device in accordance with the present invention, a display using photonic crystals may be realized in a bright environment, and a display using phosphor or quantum dots may be realized in a dark environment or ultraviolet environment.

While the invention has been shown and described with respect to the particular embodiments, it will be understood by those skilled in the art that various changes and modification may be made without departing from the spirit and scope of the invention as defined in the following claims.

What is claimed is:

1. A display method using photonic crystal characteristics, wherein a plurality of particles having electric charges with the same polarity as one another are dispersed in a solvent which is electrically polarized when electric field is applied thereto and whose electrical polarization amount changes as the applied field changes;
wherein by applying the electric field, inter-particle distances between the plurality of particles are controlled in a state when the solvent is electrically polarized; and
wherein the inter-particle distances between the plurality of particles change as at least one of intensity and direction of the field changes, so that wavelength of light reflected from the particles changes according to the changes of the inter-particle distances.

2. The method of claim 1, wherein as the electric field is applied,
first electrical force is generated between the applied electrical field and the charged particles to cause electrophoresis of the particles,
second electrical force is generated between the particles charged with the same polarity as one another, and
third electrical force is generated from the electrical polarization of the solvent; and
wherein the first to third electrical forces interact with each other so that the inter-particle distance of the particles is maintained within a specific range, and, thus, light with a specific wavelength range is reflected from the particles.

3. The method of claim 1, wherein the solvent includes superparaelectric or ferroelectric material.

4. The display method of claim 1, wherein a difference in refractive index between the particles and the solvent is more than or equal to 0.3.

5. The display method of claim 1, wherein the solvent includes a material having a polarity index of 1 or greater.

6. The display method of claim 1, wherein the particles and the solvent are encapsulated with a capsule made of light transmitting material.

7. The display method of claim 1, wherein the particles and the solvent are partitioned with a wall made of insulating material.

8. The display method of claim 1, wherein the particles and the solvent are dispersed in a droplet form in light transmitting medium.

9. The display method of claim 1, wherein a region to which the electric field is applied is divided into at least two partial regions; and wherein the electric field is respectively applied to each of the divided partial regions.

10. The display method of claim 1, wherein, after applying the electric field, an electric field having the opposite direction to the applied electric field is applied to reset the inter-particle distances.

11. The display method of claim 1, wherein, before applying the electric filed, a standby electric field is applied in order to maintain the inter-particle distance at predetermined inter-particle distances.

12. The display method of claim 1, wherein the inter-particle distances vary with changes in at least one of application duration and application period of the electric field.

13. The display method of claim 1, wherein an electric energy is generated using light passing through, the particles, and the electric field is applied using the electric energy.

14. The display method of claim 1, wherein, by applying the electric field through an upper electrode and a lower electrode, and by setting the intensity of the electric field to be less than a predetermined value to control the moving range of the particles to be less than a predetermined value, a unique color of one of the particles, the solvent, the upper and lower electrodes is displayed.

15. The display method of claim 1, wherein, by applying the electric field through an upper electrode and a lower electrode, and by setting the intensity of the electric field to be greater than or equal to a predetermined value to move the particles toward at least partial region of either the upper electrode or the lower electrode, a unique color of one of the particles, the solvent, the upper and lower electrodes is displayed.

16. The display method of claim 1, wherein by applying an electric field in a state where second particles with opposite polarity to the plurality of the particle are further dispersed in the solvent, the inter-particle distances between the particles and the inter-particle distances between the second particles are controlled differently from each other by the electric field.

17. A display method using photonic crystal characteristics,
wherein a plurality of particles having electric charges with the same polarity as one another are dispersed in a solvent, the particles being electrically polarized when electric field is applied thereto, and electrical polarization amount of the particles changes as the applied field changes;
wherein by applying the electric field, inter-particle distances between the plurality of particles are controlled in a state when the particles are electrically polarized; and
wherein the inter-particle distances between the plurality of particles change as at least one of intensity and direction of the field changes, so that wavelength of light reflected from the particles changes according to the changes of the inter-particle distances.

18. The method of claim 17, wherein as the electric field is applied,
first electrical force is generated between the applied electrical field and the charged particles to cause electrophoresis of the particles,
second electrical force is generated between the particles charged with the same polarity as one another, and
third electrical force is generated from the electrical polarization of the particles; and
wherein the first to third electrical forces interact with each other so that the inter-particle distance of the particles is maintained within a specific range, and, thus, light with a specific wavelength range is reflected from the particles.

19. The method of claim 17, wherein the particles include superparaelectric or ferroelectric material.

20. The display method of claim 17, wherein a difference in refractive index between the particles and the solvent is more than or equal to 0.3.

21. The display method of claim 17, wherein the particles and the solvent are encapsulated with a capsule made of light transmitting material.

22. The display method of claim 17, wherein the particles and the solvent are partitioned with a wall made of insulating material.

23. The display method of claim 17, wherein the particles and the solvent are dispersed in a droplet form in light transmitting medium.

24. The display method of claim 17, wherein a region to which the electric field is applied is divided into at least two partial regions; and wherein the electric field is respectively applied to each of the divided partial regions.

25. The display method of claim 17, wherein, after applying the electric field, an electric field having the opposite direction to the applied electric field is applied to reset the inter-particle distances.

26. The display method of claim 17, wherein, before applying the electric filed, a standby electric field is applied in order to maintain the inter-particle distance at predetermined inter-particle distances.

27. The display method of claim 17, wherein the inter-particle distances vary with changes in at least one of application duration and application period of the electric field.

28. The display method of claim 17, wherein an electric energy is generated using light passing through the particles, and the electric field is applied using the electric energy.

29. The display method of claim 17, wherein, by applying the electric field through an upper electrode and a lower electrode, and by setting the intensity of the electric field to be less than a predetermined value to control the moving range of the particles to be less than a predetermined value, a unique color of one of the particles, the solvent, the upper and lower electrodes is displayed.

30. The display method of claim 17, wherein, by applying the electric field through an upper electrode and a lower electrode, and by setting the intensity of the electric field to be greater than or equal to a predetermined value to move the particles toward at least partial region of either the upper electrode or the lower electrode, a unique color of one of the particles, the solvent, the upper and lower electrodes is displayed.

31. The display method of claim 17, wherein by applying an electric field in a state where second particles with opposite polarity to the plurality of the particle are further dispersed in the solvent, the inter-particle distances between the particles and the inter-particle distances between the second particles are controlled differently from each other by the electric field.

32. A display device using photonic crystal characteristics, comprising:
a display unit in which a plurality of particles having electric charges with the same polarity as one another are dispersed in a solvent which is electrically polarized when electric field is applied thereto and whose electrical polarization amount changes as the applied field changes; and
an electric field generating and/or applying unit for generating an electric field applied to the display unit,
wherein, by applying the electric field to the display unit, inter-particle distances between the plurality of particles are controlled in a state when the solvent is electrically polarized; and
wherein the inter-particle distances between the plurality of particles change as at least one of intensity and direction of the field changes, so that wavelength of light reflected from the particles changes according to the changes of the inter-particle distances.

33. The display device of claim 32, wherein the particles and the solvent are encapsulated with a capsule made of light transmitting material.

34. The display device of claim 32, wherein the particles and the solvent are partitioned with a wall made of insulating material.

35. The display device of claim 32, wherein a region to which the electric field is applied is divided into at least two partial regions; and wherein the electric field is respectively applied to each of the divided partial regions.

36. The display device of claim 32, further comprising a solar cell for generating an electric energy using light passing through the particles, wherein the electric field is applied using the electric energy.

37. The display device of claim 32, wherein, by applying the electric field through an upper electrode and a lower electrode, and by setting the intensity of the electric field to be greater than or equal to a predetermined value to move the particles toward at least partial region of either the upper electrode or the lower electrode, a unique color of one of the particles, the solvent, the upper and lower electrodes is displayed.

38. A display device using photonic crystal characteristics, comprising:
- a display unit in which a plurality of particles having electric charges with the same polarity as one another and having electrical polarization characteristics are dispersed in a solvent, the particles being electrically polarized when electric field is applied thereto, and electrical polarization amount of the particles changes as the applied field changes;
- an electric field generating and/or applying unit for generating an electric field applied to the display unit,
- wherein, by applying the electric field to the display unit, inter-particle distances between the plurality of particles are controlled in a state when the particles are electrically polarized; and
- wherein the inter-particle distances between the plurality of particles change as at least one of intensity and direction of the field changes, so that wavelength of light reflected from the particles changes according to the changes of the inter-particle distances.

39. The display device of claim 38, wherein the particles and the solvent are encapsulated with a capsule made of light transmitting material.

40. The display device of claim 38, wherein the particles and the solvent are partitioned with a wall made of insulating material.

41. The display device of claim 38, wherein a region to which the electric field is applied is divided into at least two partial regions; and wherein the electric field is respectively applied to each of the divided partial regions.

42. The display device of claim 38, further comprising a solar cell for generating an electric energy using light passing through the particles, wherein the electric field is applied using the electric energy.

43. The display device of claim 38, wherein, by applying the electric field through an upper electrode and a lower electrode, and by setting the intensity of the electric field to be greater than or equal to a predetermined value to move the particles toward at least partial region of either the upper electrode or the lower electrode, a unique color of one of the particles, the solvent, the upper and lower electrodes is displayed.

* * * * *